(12) United States Patent
Mimassi

(10) Patent No.: US 11,568,860 B2
(45) Date of Patent: Jan. 31, 2023

(54) SYSTEM AND METHOD FOR FEDERATED, CONTEXT-SENSITIVE, ACOUSTIC MODEL REFINEMENT

(71) Applicant: RockSpoon, Inc., San Jose, CA (US)

(72) Inventor: Nagib Georges Mimassi, Palo Alto, CA (US)

(73) Assignee: ROCKSPOON, INC., San Jose, CA (US)

( * ) Notice: Subject to any disclaimer, the term of this patent is extended or adjusted under 35 U.S.C. 154(b) by 0 days.

(21) Appl. No.: 17/707,885

(22) Filed: Mar. 29, 2022

(65) Prior Publication Data

US 2022/0383859 A1    Dec. 1, 2022

Related U.S. Application Data

(63) Continuation-in-part of application No. 17/575,615, filed on Jan. 13, 2022, now Pat. No. 11,430,432, which is a continuation of application No. 17/334,998, filed on May 31, 2021, now Pat. No. 11,238,849.

(51) Int. Cl.

| | | |
|---|---|---|
| *G06F 15/00* | (2006.01) | |
| *G10L 15/16* | (2006.01) | |
| *G10L 15/00* | (2013.01) | |
| *G06Q 50/12* | (2012.01) | |
| *H04L 67/00* | (2022.01) | |
| *G06N 20/20* | (2019.01) | |
| *G10L 15/07* | (2013.01) | |

(52) U.S. Cl.
CPC ............. *G10L 15/16* (2013.01); *G06N 20/20* (2019.01); *G06Q 50/12* (2013.01); *G10L 15/005* (2013.01); *G10L 15/07* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 10,497,366 B2 * | 12/2019 | Sapugay | ................ G06N 20/00 |
| 10,515,625 B1 | 12/2019 | Metallinou et al. | |
| 10,713,441 B2 * | 7/2020 | Sapugay | ................ G06F 40/30 |
| 10,896,681 B2 * | 1/2021 | Aleksic | ............... G10L 15/1815 |

(Continued)

*Primary Examiner* — Satwant K Singh
(74) *Attorney, Agent, or Firm* — Galvin Patent Law LLC; Brian R. Galvin

(57) ABSTRACT

A system and method for federated, context-sensitive, acoustic model refinement comprising a federated language model server and a plurality of edge devices. The federated language model server may comprise one or more machine learning models trained and developed centrally on the server, and distribute these one or more machine learning models to edge devices wherein they may be operated locally on the edge devices. The edge devices may gather or generate context data that can be used by a speech recognition engine, and the local language models contained therein, to develop adaptive, context-sensitive, user-specific language models. Periodically, the federated language model server may select a subset of edge devices from which to receive uploaded local model parameters, that may be aggregated to perform central model updates wherein the updated model parameters may then be sent back to edge devices in order to update the local model parameters.

14 Claims, 14 Drawing Sheets

(56) References Cited

U.S. PATENT DOCUMENTS

| | | | |
|---|---|---|---|
| 11,238,849 B1* | 2/2022 | Mimassi | G06N 20/20 |
| 11,430,432 B1* | 8/2022 | Mimassi | G06Q 50/12 |
| 2019/0042937 A1 | 2/2019 | Shelter et al. | |
| 2020/0211541 A1* | 7/2020 | Gupta | G10L 15/1815 |
| 2020/0327284 A1* | 10/2020 | Sapugay | G06N 5/025 |
| 2020/0410011 A1* | 12/2020 | Shi | G06F 16/90332 |
| 2021/0090569 A1* | 3/2021 | Aleksic | G10L 15/30 |
| 2021/0117780 A1* | 4/2021 | Malik | G06N 5/022 |

* cited by examiner

SYSTEM AND METHOD FOR FEDERATED, CONTEXT-SENSITIVE, ACOUSTIC MODEL REFINEMENT

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/575,615
Ser. No. 17/334,998

BACKGROUND

Field of the Art

The disclosure relates to the field of language models, and more particularly to the field of federated language models distributed among autonomous edge devices.

Discussion of the State of the Art

The global pandemic resulting from the emergence of COVID-19 generated lockdowns across the globe causing massive shifts in social, health, and economical interactions, just to name a few. As a result, many segments of the population have been deeply affected for example, the restaurant industry has been particularly affected, especially small local establishments. In response, patrons and restaurants have had to adapt their typical interactions with each other. The internet and various food delivery services have allowed restaurants to quickly pivot to offering take-out and delivery service via food ordering portals and $3^{rd}$ party computer and mobile device applications. Patrons have grown accustomed to viewing online menus and being able to quickly customize and submit their order through these online portals. As restaurants open back up and patrons return to dining in a restaurant setting, they may miss the ease of online ordering.

What is needed is a system and method for highly dispersed, federated, context-sensitive language models which improve restaurant service and enhance patron dining experience.

SUMMARY

Accordingly, the inventor has conceived and reduced to practice, federated, context-sensitive, acoustic model refinement system comprising a federated language model server and a plurality of edge devices. The federated language model server may comprise one or more machine learning models trained and developed centrally on the server, and distribute these one or more machine learning models to edge devices wherein they may be operated locally on the edge devices. The edge devices may gather or generate context data that can be used by a speech recognition engine, and the local language models contained therein, to develop adaptive, context-sensitive, user-specific language models. Periodically, the federated language model server may select a subset of edge devices from which to receive uploaded local model parameters, that may be aggregated to perform central model updates wherein the updated model parameters may then be sent back to edge devices in order to update the local model parameters.

According to a preferred embodiment, a system for federated, context-sensitive, acoustic model refinement is disclosed, comprising: one or more edge devices, comprising at least a plurality of programming instructions stored in the memory of, and operating on at least one processor of, a computing device, wherein the plurality of programming instructions, when operating on the at least one processor, cause the computing device to: receive context-based model adjustments; receive updated machine and deep learning central model parameters; apply the context-based model adjustments to the local models stored in the edge device; apply the updated machine and deep learning central model parameters to the local models stored in the edge device; receive local acoustic data from edge device sensors and other input mechanisms; receive local data from edge device applications, hardware, devices, and external resources; determine a context associated with local acoustic data based on the received local data and compute a confidence metric value associated with the determined context; feed the received local data and the determined context as input into one or more of the updated local machine and deep learning models to generate text-based output responsive to an edge device user query; forward text-based output to an endpoint device and set up processes necessary for fulfillment of the edge device user query; train and update local machine and deep learning models using the received local acoustic data; and upload context-aware acoustic data comprising the local acoustic data, the determined context, and the confidence metric value, to a federated language model server; and a federated language model server, comprising at least a plurality of programming instructions stored in the memory of, and operating on at least one processor of, a computing device, wherein the plurality of programming instructions, when operating on the processor, causes the computer system to: select a subset of edge devices to upload context-aware acoustic data; compare the confidence metric values with a predetermined threshold value, wherein acoustic data associated with confidence metric values greater than the predetermined threshold value may be aggregated into a context-aware training dataset; update the machine and deep learning central models using the context-aware training dataset; send the updated machine and deep learning central models to the one or more edge devices; receive and store central data from the edge devices and external sources; feed the central data into the machine and deep learning central models to generate as output context-based model adjustments for the local machine and deep learning models; and send the context-based adjustments to the one or more edge devices.

According to another embodiment, a method for federated, context-sensitive, acoustic model refinement is disclosed, comprising the steps of: receiving context-based model adjustments; receiving updated machine and deep learning central model parameters; applying the context-based model adjustments to the local models stored in the edge device; applying the updated machine and deep learning central model parameters to the local models stored in the edge device; receiving local acoustic data from edge device sensors and other input mechanisms; receive local data from edge device applications, hardware, devices, and external resources; determining a context associated with local acoustic data based on the received local data and computing a confidence metric value associated with the determined context; feeding the received local data and the determined context as input into one or more of the updated local machine and deep learning models to generate text-based output responsive to an edge device user query;

forwarding text-based output to an endpoint device and set up processes necessary for fulfillment of the edge device user query; training and update local machine and deep learning models using the received local acoustic data; uploading context-aware acoustic data comprising the local acoustic data, the determined context, and the confidence metric value, to a federated language model server; selecting a subset of edge devices to upload context-aware acoustic data; comparing the confidence metric values with a predetermined threshold value, wherein acoustic data associated with confidence metric values greater than the predetermined threshold value may be aggregated into a context-aware training dataset; updating the machine and deep learning central models the machine and deep learning central models using the context-aware training dataset; sending the updated machine and deep learning central models to the one or more edge devices; receiving and store central data from the edge devices and external sources; feeding the central data into the machine and deep learning central models to generate as output context-based model adjustments for the local machine and deep learning models; and sending the context-based adjustments to the one or more edge devices.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION

Figure 1:
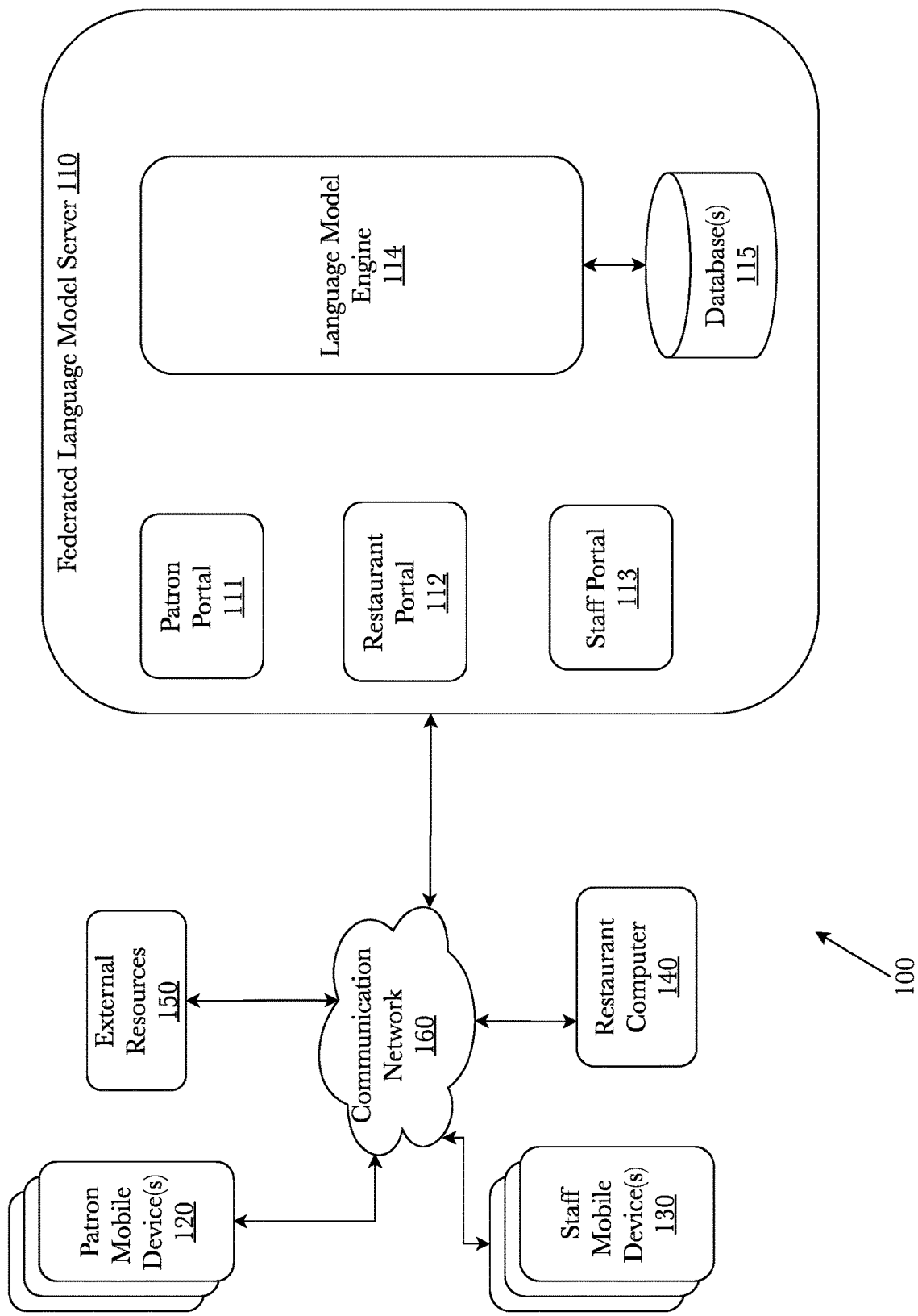
FIG. 1 is a block diagram illustrating an exemplary system architecture for federated, context-sensitive language models, according to one embodiment

The inventor has conceived, and reduced to practice, a system and method for federated context-sensitive language models comprising a federated language model server and a plurality of edge devices. The federated language model server may comprise one or more machine learning models trained and developed centrally on the server, and distribute these one or more machine learning models to edge devices wherein they may be operated locally on the edge devices. The edge devices may gather or generate context data that can be used by a speech recognition engine, and the local language models contained therein, to develop adaptive, context-sensitive, user-specific language models. Periodically, the federated language model server may select a subset of edge devices from which to receive uploaded local model parameters, that may be aggregated to perform central model updates wherein the updated model parameters may then be sent back to edge devices in order to update the local model parameters.

Transfer learning may be used to improve the language models ability to learn multiple roles and their associated dialects, grammar, and syntax. It is common to perform transfer learning with natural language processing problems. For these types of problems, a word embedding is used that is a mapping of words to a high-dimensional continuous vector space where different words with similar meaning have a similar vector representation. Efficient algorithms exists to learn these distributed word representations. The disclosed system makes use of various context data gathered from connected devices acting as edge computing devices to train local language models in a highly dispersed, federated architecture. The system may be used to develop a user-specific language model that has permanent/global/general parameters unique that user. This model may be trained using a large plurality of user voice data gathered via user interactions with the system, such as through mobile device software applications. Once these user-specific language model parameters have been identified and tuned, they may be applied, via transfer learning, to one or more role-specific language models that may apply to a system user.

A graph neural network ("GNN") may be constructed to identify clusters of nodes that represent various roles, such as a restaurant manager, waiter, patron, chef, or distributor, to name a few. Once the GNN has identified the most likely current role of a system user, it passes that information on to a speech recognition engine that may utilize transfer learning to adapt a baseline local language model (e.g., a recurrent neural network) to create a new context-sensitive role-specific local language model. Once a role-specific language model has been created, the system can quickly alternate between the baseline and role-specific language models as the system user's role changes. The system is continuously learning based upon available context-specific data it receives. By operating local language models on edge devices, the system uses a federated learning architecture that allows for quicker, better recognition of language and intent on a mobile device, while also being able to leverage a cloud-based server to perform context-based adjustments (e.g., vocabularies, dialects, voice models, etc.) to adjust local models as needed.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Edges" as used herein means connections between nodes or vertices in a data structure. In graphs, an arbitrary number of edges may be assigned to any node or vertex, each edge representing a relationship to itself or any other node or vertex. Edges may also comprise value, conditions, or other information, such as edge weights or probabilities.

"Nodes" and "Vertices" are used herein interchangeably to mean a unit of a data structure comprising a value, condition, or other information. Nodes and vertices may be arranged in lists, trees, graphs, and other forms of data structures. In graphs, nodes and vertices may be connected to an arbitrary number of edges, which represent relationships between the nodes or vertices. As the context requires, the term "node" may also refer to a node of a neural network (also referred to as a neuron) which is analogous to a graph node in that it is a point of information connected to other points of information through edges.

Conceptual Architecture

FIG. 1 is a block diagram illustrating an exemplary system architecture 100 for federated, context-sensitive language models, according to one embodiment. According to the embodiment, the system 100 may comprise a federated language model server 110 and a communication network 160 which connects the federated language model server 110 to various edge devices such as a plurality of patron mobile devices 120, a plurality of staff mobile devices 130, a restaurant computer 140, and external resources 150. Communication network 160 may comprise one or more various network connection systems and protocols known in the art. For example, patron mobile device(s) 120 and staff mobile device(s) 130 may connect to and communicate with federated language model server 110 via cell phone networks, whereas restaurant computer 140 and external resources 150 may connect to and communicate with federated language model server 110 via the internet.

Patron mobile device(s) 120 may comprise hardware such as one or more processors, a memory, a graphic processing unit ("GPU"), speakers, a microphone, global positioning system hardware, etc. Stored on the memory of the patron mobile device(s) 120 may be a software application ("App") that is connected to federated language model server 110. The App may be downloaded from an appropriate digital distribution service, such as Google Play™. The App may comprise a user interface ("UI") which may allow a patron to set up a user profile, search for restaurants and view restaurant details, order food, view food preparation status, view waitlist status, schedule reservations, and various other actions, as well as serve as the front end for a speech recognition engine that may utilize one or more default local language models and a large plurality of context data in order to adapt the local language model(s) to the device user's current role based on available context data. The App may further comprise one or more default local language models which may allow the device user to take advantage of a speech recognition engine operating on the patron mobile device 120 in order to perform various actions using his/her voice.

Staff mobile device(s) 130 may comprise similar hardware as patron mobile device(s) 120 described above. Staff mobile device(s) 130 may be personal mobile devices such as a smart phone, or staff mobile device(s) 130 may be mobile devices provided by a restaurant to its staff to be used during the employee's shift, such as a tablet that operates as a point-of-sale device. Staff mobile device(s) 130 may also comprise the same App as described above which allow employees to create an employee user profile. Staff mobile device(s) 130 may also have stored on the memory, one or more default local language model(s) which support a speech recognition engine operating on the mobile device(s). As stated above for the patron mobile device(s) 120, staff mobile device(s) 130 may receive, retrieve, or otherwise obtain a large plurality of context data to enhance the performance of the one or more default local language models operating on staff mobile device(s) 130.

Any of the patron mobile devices 120, restaurant computer 140, and staff mobile devices 130 may connect to each other via a communication network 160. The communication network may be any suitable communication network known in the art, or any future communication network that may come to exist. For example, a suitable communication network 160 may include, but is not limited to: the internet, cell phone networks such as Global System for Mobile communication ("GSM"), Code Division Multiple Access ("CDMA"), and Long Term Evolution ("LTE"), wireless local area networks ("WLAN") such as WiFi, and Bluetooth networks. Once a connection has been made, connected devices may begin to exchange data between and amongst each other. For example, a patron with a personal mobile device walks into a restaurant and connects, via the restaurant's WiFi network, to the restaurant computer 140 which automatically recognizes a unique device identifier associated with the mobile device, identifies the patron who owns the device, and checks the patron in with the restaurant host, and which then sends an alert to the mobile device when the patron's table is ready. Continuing the previous example, the patron's mobile device 120 may receive service context data from restaurant computer 140, the service context data may comprise the table number, restaurant section, and server assigned to the patron, the restaurant's name and location, reservation check-in time, number of people in dining party, and the names of people in the dining party if available. Patron mobile device 120 may analyze the received service context data in order to dynamically adjust the default local language model(s) that may be stored and operating on patron mobile device 120.

Restaurant computer 140 may be connected to and exchange data with a separate point-of-sale ("POS") device, or restaurant computer 140 may be operated as a POS device. When a waiter asks a patron what they would like to order, the system 100 operating through the patron's mobile device 120 listens for and understands the patron's order, and then the order is sent to and entered into the POS device automatically. This may allow restaurant wait staff to spend less time entering food orders into the POS device, and more time accommodating patrons which may increase the wait staff's potential earnings via higher tips earned from more attentive service, and may improve patron satisfaction and his/her overall dining experience. Wait staff may interact with the POS device (e.g., restaurant computer 140) to verify that a received order corresponds to what the patron actually ordered and to verify the received food order was applied to the correct table and server. In the case that a received food order was inconsistent with what the patron actually ordered; the server can manually input the correct food order. In other embodiments, the staff mobile device 130 may receive the food order as processed by the system 100 to allow the patron's server to quickly verify or edit the outputted food order before forwarding the food order to the POS device. Order errors, edits, and inconsistencies that require correction may be logged and stored for future use in language model training, for auditing purposes, and/or for system performance metrics. Both the incorrect output and the corrected food order may be linked and stored together. The corrected food order can be thought of as a quasi-transcription of the patron's food order, which can be used for language model training purposes to compare model output (patron's food order) with the goal output (the corrected food order). The linked, corrected food order may be sent from the POS device to patron mobile device 120 where it can be used as training data or context data for the specific, default local language models operating on patron mobile device 120. Restaurant computer 140 may also store and operate the one or more default local language models leveraged by a speech recognition engine also stored and operated on the restaurant computer 140. The above described App may also be stored and operating on restaurant computer 140.

According to an embodiment, the various edge devices (e.g., patron and staff mobile device(s) 120, 130, restaurant computer 140) operating the App and the associated default language models, may grant permission to the App to access other applications and hardware operating on the edge device. For example, a device user may grant permission for App and the system 100 to access social media accounts, email, phone, and text messaging applications, and device hardware such as speakers, microphones, global positioning systems ("GPS"), and the like in order to gather more context data to enhance the performance of the local language model(s) operating on the device.

Federated language model server 110 may receive, retrieve, or otherwise obtain external data from external resources 150. External resources 150 may provide information regarding traffic information, maps, and restaurant, patron, or staff information that may be available via the internet such as restaurant information scraped from a restaurant website or social media account.

Federated language model server 110 may be a cloud-based computing device operating on a single machine, or distributed among a plurality of computing machines such as in a data center, for example. Federated language model server 110 may comprise a series of portals that allow patrons, staff, and restaurants to enter a plurality of information which can be stored in a database 115 and retrieved from database 115 by a language model engine 114 to adjust one or more language models based upon a variety of metrics and context data. Patrons may connect to a patron portal 111 via a patron mobile device 120 to create, update, or edit a user profile comprising a plurality of user preferences and other information that can be stored in database 115, and used by language model engine 114 to train and update central language model(s) stored and operating on federated language model server 110. A patron's user profile may comprise, but is not limited to, a username, age, gender, email address, phone number, unique device identifier, patron roles, and patron preferences. Examples of the types of preferences that a patron may enter include, but are not limited to: food preferences such as types of food, food allergies or sensitivities, frequency with which preferred foods are eaten, ranking of particular foods relative to other foods, customer inconvenience preferences such as time delays and routing distances, food attributes such as price, calories, ingredients, and side dishes. In some embodiments, certain of these preferences will be determined by the system. For example, the types of food preferred by the customer and the frequency with which preferred foods are eaten may be determined based on the customer's history of usage as stored in a database 115 in the system. Other such preferences and factors may also be determined by the system. A staff portal 113 may exist that functions similarly to patron portal 111. Staff portal 113 may be used by restaurant staff to create and edit user profiles and preferences which may be stored in database 115.

Likewise, restaurants may connect to the restaurant portal 112 to enter information about the restaurant, its employees, and its menu. Examples of the types of information that a restaurant may enter include, but are not limited to: restaurant name, location, types of food offered, hours of operation, phone number, website address, staff scheduling, staff names, staff assignments, all menu offerings, the food components that make up each menu offering (e.g., spaghetti with meat balls is menu offering and its food components are pasta, sauce, meatballs, and garlic bread), food preparation times for certain dishes (including adjustments to food preparation times during busy periods for the restaurant), to-go container inventory, prices, calorie counts, ingredients, side dishes, drinks, and special pricing options like daily "happy hour" specials or seasonal offerings. In some embodiments, the system may be able to determine certain restaurant information by accessing external resources 150 such as mapping websites and applications. For example, the system may access a publicly-available mapping website such as Google maps, which may contain information about the restaurant's name, location, types of food offered, hours of operation, phone number, etc. Thus, in some embodiments, it is not necessary for the restaurant to enter certain information through the portal, as the information may be automatically obtained from external resources 150.

The system 100 continuously learns in a nested way. The system 100 can learn about an individual in specific contexts, about an individual's more permanent and global characteristics, about similar individuals, and about venues. An individual's permanent and global characteristics may include voice characteristics. Factors that can be used as context may include, but are not limited to, actors, roles, venues, time, devices, and locations. One or more of the factors may be analyzed either singly or in some combination in order to provide the language models with context data associated with a received voice data input.

Figure 2:
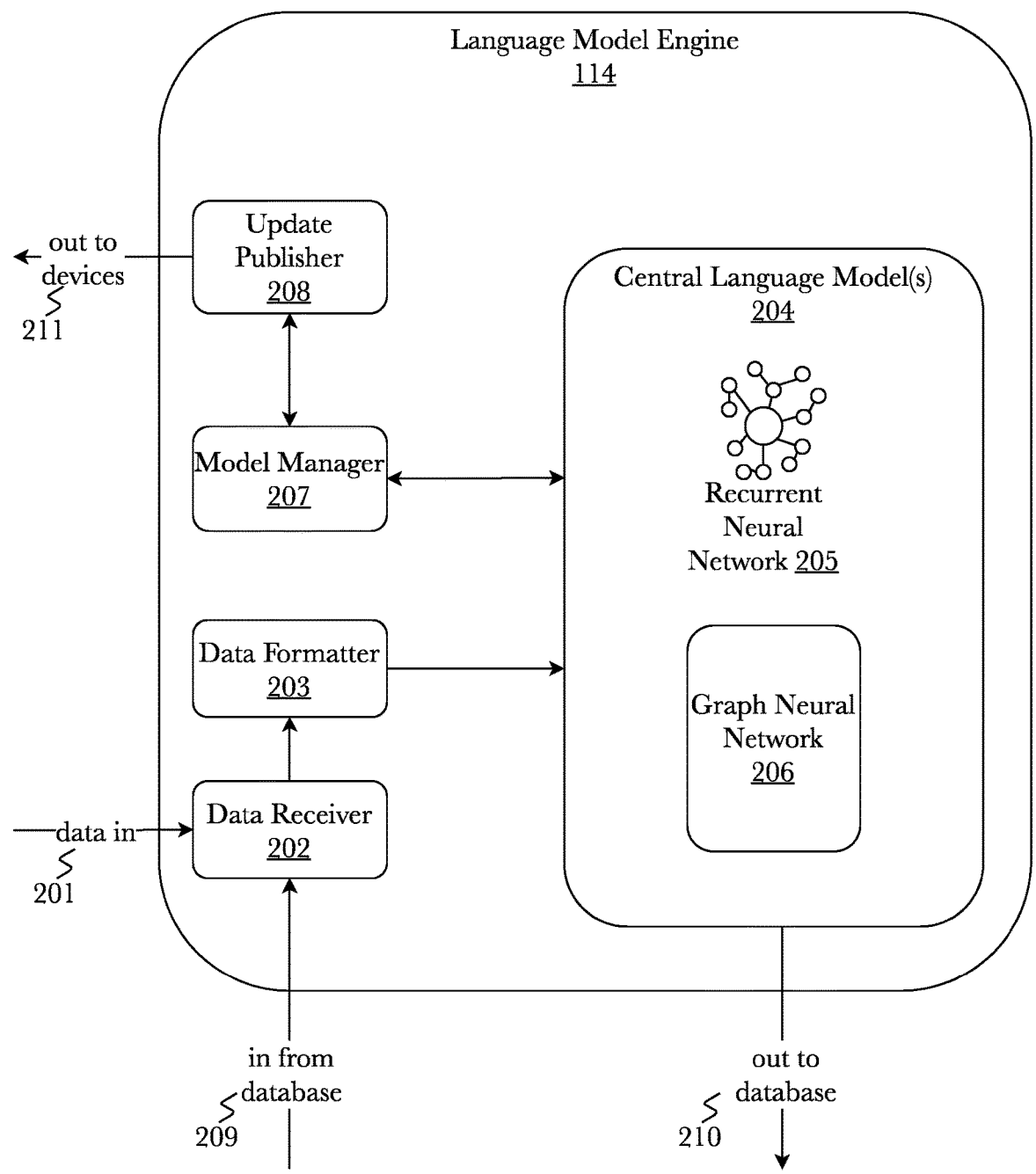
FIG. 2 is a block diagram illustrating an exemplary architecture for an aspect of a federated, context-sensitive language model system, the language model engine.

FIG. 2 is a block diagram illustrating an exemplary architecture for an aspect of a federated, context-sensitive language model system 100, the language model engine 114. Language model engine 114 may comprise a data receiver 202 which may receive requested and transmitted data in 201 from a plurality of edge devices such as mobile devices and venue computers operating in the system 100. Data receiver may also receive or retrieve data from a database 209 when requested by language model engine 114. The types of data sent to language model engine 114 may include voice data, text-based data, and a large plurality of context data. Additionally, federated language model server 110 may request a subset of connected edge devices to send default local model parameters, and the language model engine 114 may receive the subset of edge device data. A data formatter 203 may aggregate the received subset of edge device local model parameters, and then update one or more of the central language models 204. After data is received, it may be sent to the data formatter 203 which performs various data pre-processing tasks including, but not limited to, data cleaning, data parsing, data normalization, data labeling, data transforms, and data reduction.

Formatted data and aggregated model parameters may be stored in database 115 for future use and/or data auditing tasks. Formatted data may be sent to and used for training purposes of one or more central language models 204. A recurrent neural network ("RNN") 205 may be constructed to enable accurate and optimized language modeling. In some embodiments, the RNN 205 may be a long short-term memory ("LSTM") neural network. A typical RNN approach to language modeling can be described using the following model properties: associate each word in the vocabulary with a distributed word feature vector, express the joint probability function of word sequences in terms of feature vectors of these words in a sequence, and learn simultaneously the word feature vector and the parameters of the probability function. A RNN 205 language model may provide further generalization: instead of considering just several preceding words, neurons with input from recurrent connections are assumed to represent short term memory. The model learns by itself from the data how to represent memory. While shallow feedforward neural networks (those with just one hidden layer) can only cluster similar words, recurrent neural network (which can be considered as a deep architecture) can perform clustering of similar histories. This allows for instance efficient representation of patterns with variable length. A RNN language model 205 is more robust at determining a user's intent in various different situations and contexts based upon its ability to use "remembered" cluster histories and their associated neuron connections. The RNN 205 may be trained using text-based data such as emails, text-messages, point-of-sales receipts, restaurant menus, and various other text generating sources. The RNN 205 may also be trained using voice data such as phone calls, device user voice commands, video calls, and various other voice data generating sources.

After model training, the parameters and hyperparameters (e.g., biases, weights, coefficients, etc.) may be distributed by the federated language model server 110 to a plurality of system 100 connected edge devices such that the edge devices may operate a default local version of the RNN 205 based upon the received model parameters. The default local language models operating on the edge devices may use the received parameters to initialize a local model that can be adapted to create a language model based upon the device user. The local model parameters will change to reflect the device user as the local model receives user specific voice, text, and context data during device operation. Periodically, one or more edge devices may be instructed by the federated language model server 110 to upload its local model parameters to the server 110, where they may be aggregated by the language model engine 114 in order to perform central language model 204 updates. Federal language model engine 114 may compute the sum of the aggregated parameters, and then use the summed parameter values to perform updates to central language models. In this way, the system 100 can leverage the computing power of edge devices to train the local models operating on the edge devices, and update the central language models 204 periodically. This distributed edge learning architecture allows model training and processing to be conducted locally on an edge device, without the need for constant communication with the server 110. This enables quicker, better recognition of intent on a mobile edge device because context data gathered by the device can be processed by the local language models, without the need to upload data to the server 110, wait for the server 110 to process the data, generate an output using the central language model(s) 204, and then download the output to the mobile device for further use. This drastically improves system latency and performance, as well as improves mobile device user's data security by allowing mobile device user data to remain on the device instead of uploading potentially sensitive data to the server 110.

According to some embodiments, central language model(s) 204 may further comprise a graph neural network ("GNN") 206 which may be used to map the relationships between edge devices, device users (e.g., patrons, staff, etc.), user roles, venues (i.e., restaurants), and a plurality of context data collected via the edge devices and various external resources 150. A graph is a data structure consisting of two components, vertices and edges. A graph can be described by the set (V,E) of vertices V and edges E. Edges can be either directed or undirected, depending on whether there exist directional dependencies between vertices. The vertices may also be referred to as nodes, and these two terms are interchangeable. Nodes can be used to represent users, products, venues, employees, key words or phrases, etc., while the edges may represent connections between nodes. Each node has a set of features defining it. In the case of a user, this could be, for example age, gender, country of residence, and so on. Each edge may connect nodes together that have similar features. For example, for a single reference node, the surrounding nodes pass their messages (embeddings) through the edge neural networks into the recurrent unit on the reference node, wherein the new embedding of the reference recurrent unit is updated by applying said recurrent function on the current embedding and a summation of the edge neural network outputs the surrounding node embeddings. This process may be performed, in parallel, on all nodes in the network Language model engine 114 first constructs a graph representing the available data and forms feature vector embeddings of the nodes. Then all the nodes may be converted into recurrent units and all the edges house simple feed-forward neural networks. Once the conversion of nodes and edges is completed, the graph may perform message passing between the nodes. This process involves pushing messages (i.e., the embeddings) from surrounding nodes around a given reference node, through the directed edges. Language model engine 114 performs this process for all nodes a plurality of times, then it sums over the embedding vectors of all nodes to get a graph representation which may be passed to into higher layers in the GNN 206 or used to represent the graph's unique properties. Once the language model engine 114 performs the message passing procedure a few times, a completely new set of embeddings for each nodal recurrent unit are obtained. Through the multiple rounds of message passing, the nodes know more about their own information (features) and that of surrounding nodes. This creates an even more accurate and useful representation of the entire graph.

Once a GNN 206 has been constructed, it may be developed to identify clusters of nodes that can be used to identify a system 100 user's current situation and role when voice and/or text context data is received by language model engine 114. In other words, the GNN 206 may be used to identify and classify user roles using context data gathered from the user's mobile device and processed through the GNN 206. Factors that may be used for context include, but are not limited to, actors, roles, venues, times, devices, locations, etc. For example, a system 100 user may have the App on his mobile device and granted permission for the App to access the microphone on the mobile device, and using the microphone the mobile device records the user speaking to people around him as well as background noise in whatever environment or setting he may be located. The mobile device may be operating a local GNN 206 which can use the recorded user voice data, as well as device location data, and the device user's work schedule to determine the user's most likely current role is an employee (e.g., restaurant waiter). Once a user's role has been determined by the GNN 206, the user's role may be sent to the RNN 205 to make role-related, context-based language model adjustments (e.g., vocabularies, dialects, voice models, etc.) in order for RNN 205 to perform more accurate determinations of language and intent.

Language model engine 114 may further comprise a model manager 207 which may perform various actions regarding the central language model(s) 204. Model manager 207 may send 210 and request data from database 115, such as storing previous and current model states (e.g., model parameters) in database 115. Model manager 207 may monitor and analyze model performance by recording a variety of model metrics such as, for example, classification accuracy, logarithmic loss, confusion matrix, area under curve, mean absolute error, and mean squared error, to name a few. Model manager 207 may store and retrieve model metrics from database 115. Model manager 207 may periodically generate data requests for local model parameters from an identified subset of edge devices. The requested model parameters from the subset of edge devices may be collected by the language model engine 114 and aggregated and applied to central language model(s) 204 to perform model updates. Model manager 207 may also determine a subset of edge devices to send model updates to after central language model(s) 204 have been updated. The identified subset of edge devices that will receive updates may be sent to an update publisher 208 which locates the subset of edge devices on the network, establishes a connection to the edge devices, and transmits 211 updated model parameters to the edge devices, wherein the local language models operating on the edge device may be updated with the received model parameters. Update publisher 208 may also send context-based adjustments (e.g., vocabularies, lexicons, dialects, etc.) to adjust local models as needed.

Figure 3:
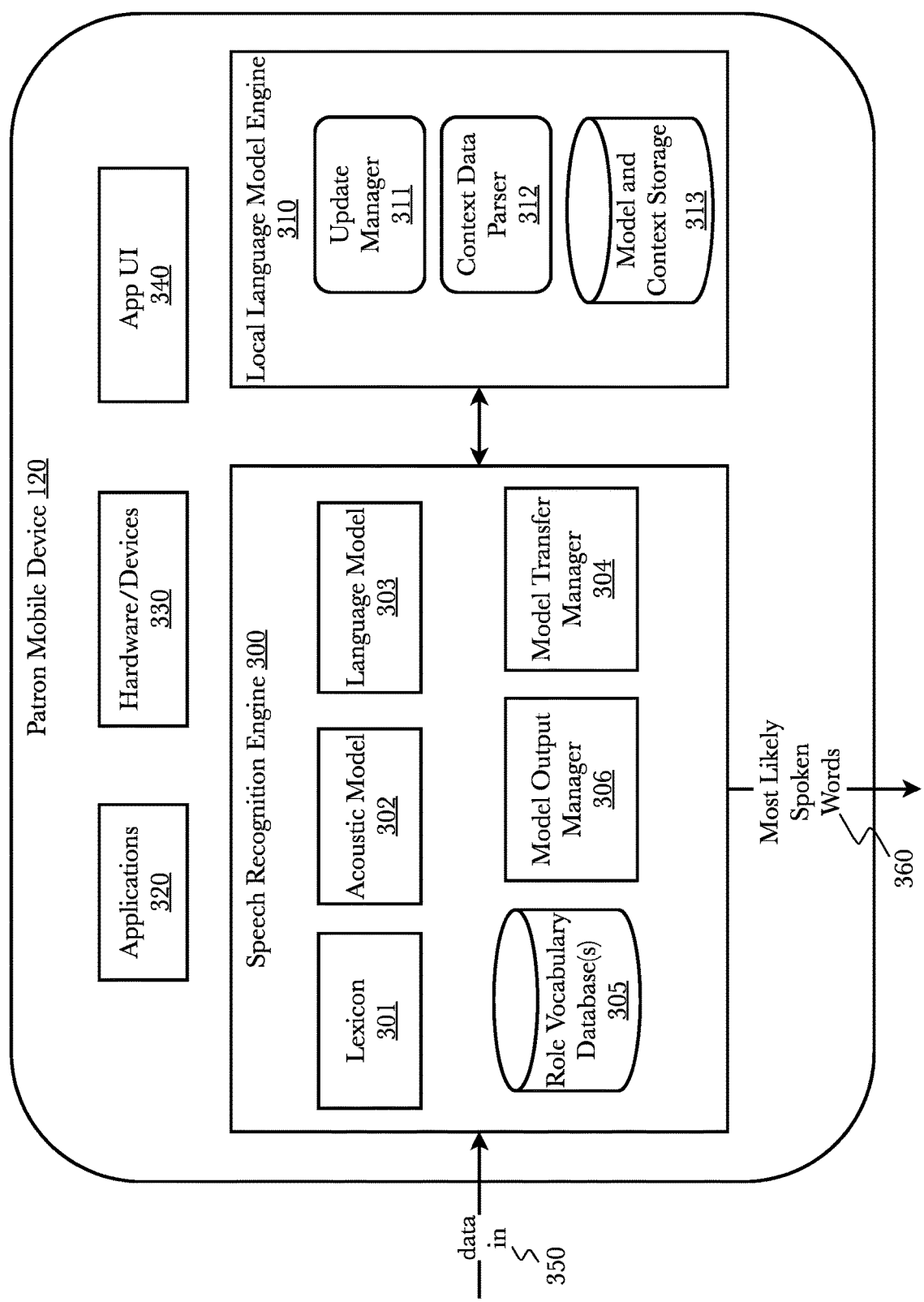
FIG. 3 is a block diagram illustrating an exemplary architecture for an aspect of a federated, context-sensitive language model system, the patron mobile device comprising a speech recognition engine and a local language model engine.

FIG. 3 is a block diagram illustrating an exemplary architecture for an aspect of a federated, context-sensitive language model system 100, the patron mobile device 120 comprising a speech recognition engine 300 and a local language model engine 310. The patron mobile device 120 is shown in this exemplary diagram, but the systems and processes described herein are equally applicable to a staff mobile device 130, restaurant computer 140, and any other edge device(s) that may be connected to the system 100. Patron mobile device 120 may further comprise a plurality of applications 320 stored and operated on the mobile device, existing hardware and devices 330, and the App UI 340 which allows the mobile device user to interact with the system 100 application using the user's spoken voice. Mobile device user may grant permission for the system 100 to access various other applications 320 and hardware 330 operating on the mobile device in order to gather context data. For example, access may be granted to email and text messaging applications to gather text-based context data, access may be granted to social media accounts linked to the mobile device user, access may be granted to the mobile device's microphone, speakers, and GPS hardware to gather voice-based context data and location context data.

According to an embodiment, local language model engine 310 may comprise an update manager 311, a context data parser 312, and a model and context data store 313. Update manager 311 may communicate and exchange data with federated language server 110. Update manager 311 may receive local model parameter updates from the server 110 and apply them to the one or more local models operating on the patron's mobile device 120. Additionally, when the patron's mobile device is among the subset of edge devices selected by the server 110 to upload the local model parameters for aggregation and central model parameter updates, update manager 311 may retrieve the local model parameters from storage 313 and send them to the server 110. Update manager 311 may also determine when local model training and parameter upload/download process should occur. For example, update manager 311 may have the mobile device perform local model training when it detects the device is plugged in and charging so that the processing power necessary to train the model does not drain all the power of the device. As another example, update manager 311 may perform local model parameter uploads to the server 110 when the device is not being used by its owner, as data uploads on mobile devices may require a lot of bandwidth that may reduce the mobile device performance. Model and context storage 313 may be used to store local model parameters, role-specific model parameters, context data, and speech recognition engine 300 output.

Context data parser 312 may receive context data from applications 320, hardware and devices 330, and the App, and then format and analyze the context data. Once context data has been parsed, formatted, and analyzed it may be placed in model and context storage 313 for further use. Context data parser 312 may also send parsed, formatted, and analyzed context data to one or more local language models operating on the patron's mobile device 120 to be used as input for training and prediction tasks. Context data may include, but is not limited to, actors, roles, venues, times, devices, and locations. Actors may include people, businesses, or services that are often encountered and referred to in a specific context. For example, an individual working at a restaurant may be surrounded by actors such as coworkers, managers, delivery drivers, cooks, patrons, and distributors. The system 100 can identify an individual's role in specific contexts using information about the actors located around the individual.

Stored in the memory of and operating on the processor of the patron mobile device 120 may be a speech recognition engine 300 which may receive patron voice data input 350 and context data to determine the language and intent of the patron to output the most likely spoken words 360 of the patron. When speech recognition engine 300 receives voice data, it may store the voice data in a temporary cache as the voice data is further processed, and transform the voice data into a waveform for signal processing actions and functions. Signal processing may be conducted on the transformed waveform to determine unique characteristics of the mobile device user's voice, this may be considered a "voice fingerprint" which can be used to identify a speaker and to develop permanent characteristics about an individual. Unique characteristics may include, but are not limited to, timbre, cadence, frequency, and inflection. A user's voice fingerprint and permanent characteristics may be stored in the memory of the mobile device for further use. For example, a patron may be dining in a restaurant and speaking with a waiter while the patron's mobile device is actively listening to both the patron's voice and the waiter's voice, and the mobile device could use the patron's voice fingerprint to identify the patron and to determine the role of the patron using context data and voice data. The patron and the waiter are most likely talking about the menu and the items on it. The federated language model system 100 operating on the patron's mobile device can identify the patron, use the words being spoken between the patron and the waiter, and use context data such as the patron's location data to determine the current role of the patron is as a patron at a restaurant.

The speech recognition engine 300 may comprise a lexicon 301, an acoustic model 302, one or more language models 303, a model transfer manager 304, a role vocabulary database(s) 305, and a model output manager 306. The acoustic model 302 models the sounds of the language, the lexicon 301 describes how those sounds combine to make words, and the language model 303 models how those words are constructed into sequences of words. Used together in speech recognition engine 300, these allow the system to automatically transcribe speech. There are numerous open source, publicly available lexicons that may be used by the system 100. Likewise, the acoustic model 302 can leverage publicly available resources such as ARPABET, which provides a set of phonetic transcription codes developed by Advanced Research Projects Agency ("ARPA"). It represents phonemes and allophones of General American English with distinct characters of ASCII characters. Similar acoustic model sets developed for languages other than English may be used by the speech recognition engine 300, according to other embodiments.

Model output manager 306 may receive the output of the speech recognition engine 300, the most likely spoken words 360, and determine, based on a plurality of factors such as the device user's current role, venue, language model, context data, etc., where the generated output needs to be sent. Model output manager 306 may send output data to other applications or hardware operating on the mobile device, or the output data may be sent via communication network 160 to other devices connected to the system 100. Model output manager 306 may also store output data in a datastore, such as a model and context storage database 313. In one particular use case, a patron may be dining at a restaurant with their mobile device sitting on the table in front of her with the App open, and when the patron states her order to the waiter the patron's mobile device hears her spoken order, processes the voice data, outputs her most likely spoken words, and the model output manager 306 receives the output and a plurality of context data in order to determine the output should be sent to the POS device associated with the restaurant the patron is dining at.

Model transfer manager 304 may be used to adjust one or more language model 303 parameters when a mobile device user's role has changed. Transfer learning is a method of training and developing new machine learning algorithms or models using a prior existing and properly functioning machine learning model. This method of machine learning model construction greatly reduces the amount of training data and time required to create a new model. For example, a convolutional neural network ("CNN") that has been trained to and successfully does identify and classify pictures of dogs, may be used to create a new CNN to identify and classify pictures of cats. Transfer learning may be accomplished by using the parameters of a fully trained and useful model, as the starting parameters for a new, different model. The system 100 may utilize transfer learning to produce context-sensitive, adaptive language models based upon a system user's current role and context. For example, once an individual's permanent characteristics have been learned and a baseline local language model has been created, that baseline language model may be transferred to another local language model associated with one of the individual's roles. The role-specific local language model may then be quickly trained using the baseline local language model's parameters as a starting point. Role-specific local language parameters may be stored in model and context storage 313. In one embodiment, a GNN operating on a mobile device determines, via received context data, an individual's most likely current role and then sends the current role information to model transfer manager 304 which may adjust the current local language model parameters to parameters associated with the individual's determined role.

The system 100 operating both on a mobile device and on federated language model server 110, allow the central and local language models to continuously learn in a nested way. Initially, the local language models operating on an individual's mobile device are using default model parameters generated via the central language models 204 running on the server 110 and downloaded to the mobile device. As the local language models operate on the mobile device, they become tailored to the device user as the user interacts with the device and as the device gathers device and user-specific context data. The system 100 can use these inputs to train and adapt the local language models to learn about an individual's permanent characteristics. These characteristics may be unique vocal characteristics as described above. Permanent characteristics may include common names, words, phrases, venues, voice requests, etc., that could be used by the language models to determine who is speaking. Permanent characteristics may comprise local, user-specific, context-sensitive language model parameters.

Once the system 100 has learned an appropriate set of permanent characteristics, it can learn about the individual in specific contexts. A system 100 user may have different roles and each would have its own dialect determined in specific contexts. For example, John Doe may have multiple roles such as patron, waiter, and host. John Doe at restaurants A and B, with different roles, is the same as John Doe the patron at many other restaurants. When John was working as waiter in restaurant A the system 100 can identify his accent, and when John goes to work at restaurant B as a host, the system 100 can learn faster because it already knows his accent (permanent characteristic) and the role (host) vocabulary. Actors, roles, vocabulary, and prosody are factors that can be used to define local personae and to adjust local language models based on the personae.

The system 100 may also continuously learn about similar individuals. For example, federated language model server 110 may identify a subset of mobile devices belonging to wait staff, and request local model parameters be uploaded to server 110 where the received local model parameters are aggregated and used to update central language model parameters associated with wait staff. Then the updated central model parameters may be distributed back to the subset of mobile devices wherein the local models are updated with the new received parameters, which have been trained on data gathered from similar individuals. The subset of edge devices may be selected based on a variety of metrics or characteristics.

The system 100 can also continuously learn about venues. The system 100 can pick up on shifts in vocabulary as menus change in a restaurant, but menu changes are only one example of how venue-specific vocabularies can be adjusted automatically without the need for machine learning. However, machine learning can help refine the language models associated with a venue, as people may actually use variant jargon to refer to new menu items, which the system 100 can learn. For example, front-of-house (e.g., servers, hosts, busboys) restaurant employees may refer to food items by their menu name, whereas back-of-house (e.g., kitchen staff) may use different terms (e.g., slang, verbal shorthand, kitchen jargon) to refer to food items. In this scenario, the system 100 may be able to learn the food items the kitchen jargon is referring to.

Language model 303 may comprise one or more machine learning algorithms/models, such as local versions of the RNN 205 and GNN 206 described above in FIG. 2. The local RNN may utilize lexicon data, acoustic data, context data, and role specific vocabulary data when processing voice data to determine the user's intent and most likely spoken words 360. A role specific vocabulary database(s) 305 may be present which stores common words and phrases most often associated with a specific role. These role specific vocabularies may be periodically updated by analyzing local language model 303 data. For example, the local GNN operating on the mobile device may be designed to identify clusters within the graph that clearly outline specific roles, and among these clusters may be role-specific context data including words and phrases that are exclusive to a specific role cluster. The exclusive context information, words, and phrases may be used to create and update a role vocabulary stored within the role vocabulary database(s) 305. In this way, as role vocabularies change, or become more defined, speech recognition engine 300 may use the vocabularies to quickly ascertain a mobile device user's situation, role, and intent using role-specific vocabulary words that strongly correlate to a specific role.

As with all machine learning systems, these speech recognition models are heavily dependent on the data used to train them. Careful selection of training data enhanced with a large plurality of context data allows the system to construct a language model for a specific scenario, actor, or role. Mobile devices (e.g., smart phones, tablets, laptops, wearables, etc.) are ubiquitous and the applications and hardware contained therein are excellent at collecting and generating a wide variety of context data. Current and future mobile devices have enough processing power to train and utilize machine learning algorithms and models. By combining the processing capabilities and the widespread collection of context data, mobile devices can locally train and develop context-sensitive, user-specific machine learning models. This allows the speech recognition accuracy and the underlying language models to be optimized for the specific application.

Figure 6:
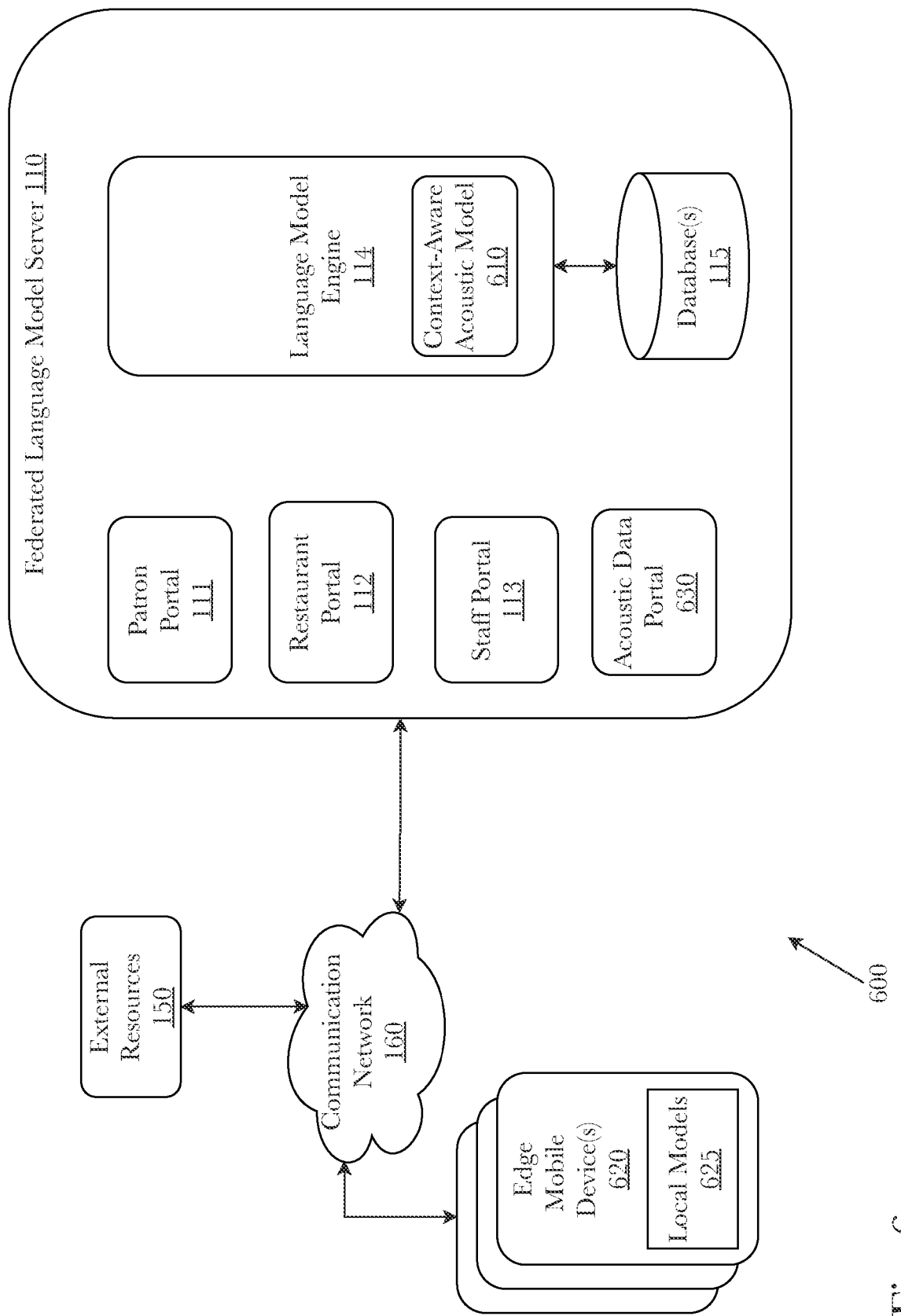
FIG. 6 is a block diagram illustrating an exemplary system architecture for federated, context-sensitive, acoustic model refinement system, according to some embodiments.

FIG. 6 is a block diagram illustrating an exemplary system 600 architecture for federated, context-sensitive, acoustic model refinement system, according to some embodiments. According to various embodiments, acoustic model refinement system may comprise one or more mobile devices 620 (i.e., edge devices or federated devices) each of which may be configured to store and operate a speech recognition engine and a local language model engine as well as local models 625 of various language and acoustic models, a federated language model server 110 configured for bidirectional communication and data exchange with the one or more mobile devices 620 via a communication network 160, and an acoustic portal 630 configured to receive context-aware acoustic data and aggregate the received data into one or more training datasets. The speech recognition engine and local language model engine may interface with available mobile device hardware (e.g., sensors, microphones, touch screen input, speakers, etc.) and mobile device software (e.g., software applications, cloud services, operating system kernel, etc.) in such a way that each federated mobile device's local language models are used to provide context for acoustic data collection. This collected context-aware acoustic data may be used as an input to train, improve, and update the central model(s) 610 stored and operating on federated language model server 110. The central model updated with context-aware acoustic information may be transmitted back to the mobile devices wherein the local language models can be updated with trained context-aware local acoustic information. Mobile device 620 may use the microphone hardware of the mobile device to capture (e.g., record) background noise/sound patterns and determine a context associated with the recorded sound. For example, a mobile device may capture a voice query from the mobile device user and tag the recorded acoustic data as "recorded at a train station", which can be used as context-aware acoustic data for language sounds with specific kind of background noise. This type of data capture and contextualization improves future recognition in similar context, and improves future recognition in entirely new contexts (i.e., in that not recognizing background noise can preclude known acoustic contexts).

Mobile devices 620 may be able to determine the context of background noise/sound patterns by accessing device data generated and/or gathered via mobile device hardware and software. For example, local device data can include, but is not limited to, location (e.g., global positioning system (GPS) coordinates, social media check-ins or posts, wireless network connections (Bluetooth, WiFi), etc.), time, weather, calendars and appointments, social media feeds, microphone data, sensor data (e.g., microphone, speakers, gyroscope, magnetometer, pressure sensors, thermal sensors, biometric sensors, etc.), text messages, emails, voice or video call data, contact list data, and the like. Additionally, mobile devices 620 may access external resources 150 to aid in the determination of context associated with acoustic data such as, for example, accessing social media servers, accessing public and/or private databases to take advantage of "big data", accessing external services such as Google Maps™ to retrieve traffic data or data related to a specific venue/location, acquiring current local events and news, etc.

According to some embodiments, federated language model server 110 may select a subset of mobile devices 620 from which to receive context-aware acoustic data. Context-aware acoustic data received from mobile devices may be aggregated into a training data set of acoustic data which can be used to train and/or update one or more central acoustic models 610 stored and operating on federated language model server 110. For example, may select a subset of mobile devices from which to receive context-aware acoustic data based on the location of the mobile devices such as mobile devices that are in a restaurant setting. A mobile device from this subset of devices may collect acoustic data using available device hardware and software while in a restaurant setting and tag the data as acoustic data from a restaurant setting. At the server side, this restaurant specific context-aware acoustic data may be aggregated with other restaurant specific context-aware acoustic data to form a labeled training dataset which can be used to train and/or update one or more machine and deep learning models such as, for example, a central acoustic model. After the central model has been trained and/or updated, the updated model parameters may be transferred back to all federated mobile devices 620 where the local acoustic model(s) operating on the federated mobile devices may be updated using the received updated central model parameters. In this way, federated mobile devices 620 can function as data collection and pre-processing devices providing context-aware acoustic data for model training purposes. In other embodiments, updated central acoustic model parameters may be transferred back to only the subset of mobile devices which contributed context-aware acoustic data to the training dataset. In some embodiments, the central and local context-aware acoustic model may be a neural network model. In an embodiment, the neural network may be a recurrent neural network. In other embodiments, the neural network may be a graph-based neural network. According to various embodiments, the central and local context-aware acoustic model may be a recurrent neural network trained to classify received acoustic data into a context, wherein the context provides additional information related to a user submitted query.

According to various embodiments, federated language model server 110 may receive context-aware acoustic data from mobile devices 620 wherein the context-aware acoustic data comprises acoustic data, an assigned context, and a confidence metric value indicating the uncertainty in the assigned context. At the server 110 received context-aware acoustic data that has a confidence metric value exceeding a predetermined threshold value may be aggregated into a training dataset which can be used to train and update the context-aware acoustic central model 610. Received context-aware acoustic data that falls below the predetermined threshold value may be discarded. Once a central model 610 has been trained and updated with the aggregated context-aware acoustic training data, the central model parameters may be transferred back to all of, or a selected subset of, mobile devices 620 where the parameters may be applied as local model 625 updates. In this way, local acoustic models can be refined to determine context of received acoustic data based on background noise.

Furthermore, federated language model server 110 may periodically select a subset of mobile devices 620 from which to receive local context-aware acoustic model parameters. These model parameters may be aggregated and an average value of the received local context-aware acoustic model parameters may be computed and then applied to the central context-aware acoustic model as updates. Once the central model has been updated using the average aggregated local model parameters, the updated central model parameters may be transferred back to the mobile devices where the local context-aware acoustic model may be updated.

Figure 7:
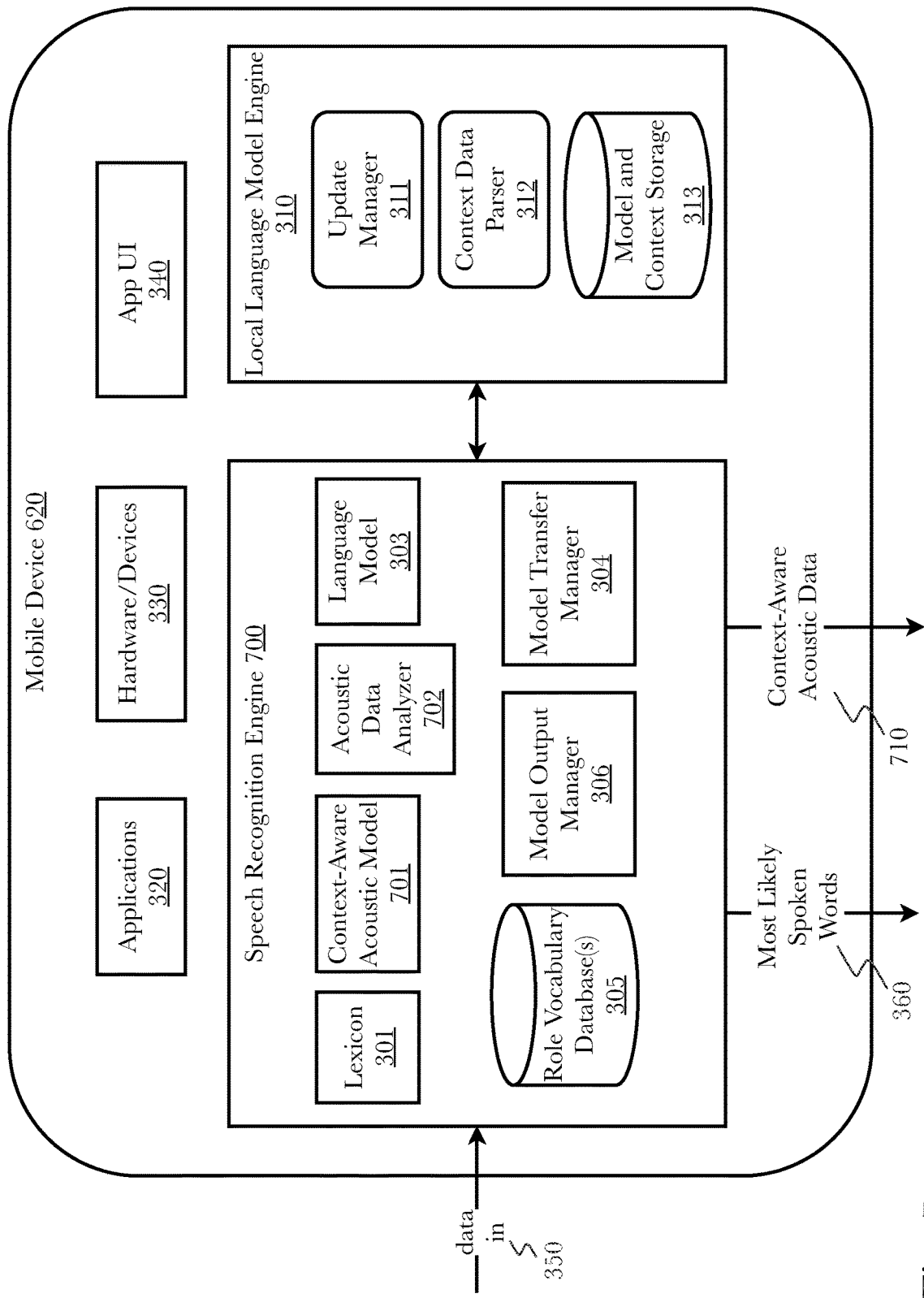
FIG. 7 is a block diagram illustrating an exemplary architecture for an aspect of a federated, context-sensitive, acoustic model refinement system, the mobile device comprising a speech recognition engine and a local language model engine.

FIG. 7 is a block diagram illustrating an exemplary architecture for an aspect of a federated, context-sensitive, acoustic model refinement system 100, the mobile device 620 comprising a speech recognition engine 700 and a local language model engine 310. This mobile device 620 and its systems operates in much the same way as patron mobile device 120 (referring to FIG. 3 above), except this mobile device 620 speech recognition engine 700 comprises a context-aware acoustic model 701 and an acoustic data analyzer 702. The acoustic data analyzer 702 may receive acoustic data such as, for example, an audio file recorded using the mobile device microphone and process the acoustic data for analysis. Acoustic data analyzer may receive an audio file and use frequency analysis tools to identify background noise in the audio file to isolate background noise from other noise such as the voice of the mobile device user. Once isolated, the speech recognition engine 700 may transcribe the isolated audio data into a text format. The contents of the textually formatted audio file may be analyzed to determine a current user's role based on the context associated with and/or derived from the textually based audio file.

Acoustic data analyzer may receive acoustic data and retrieve other data from mobile device 620 applications 320, hardware/devices 330, and input received via the app UI 340 in order to generate a context assignment and a confidence metric for the acoustic data. For example, acoustic data analyzer can receive acoustic data and use device data such as location and time data, as well as data gathered from calendar and email applications operating on the mobile device 620, to indicate where and when acoustic data was gathered. This contextual data may be used to assign a context to the acoustic data so that it may be sent to federated language model server 110 to be used as labeled training data. Additionally, for each context-aware acoustic data acoustic data analyzer 702 may determine a confidence metric that considers the amount of uncertainty associated with assigned context. According to some embodiments, the confidence metric may be determined (e.g., calculated, computed, derived, or otherwise obtained) based on the amount of corroborating data that indicates a specific context. Corroborating data may be gathered from sources including, but not limited to, software applications 320, hardware/devices 330, mobile device user input received via the app UI 340, and external resources gathered via a network connection such as the internet or via a mobile network. For example, acoustic data analyzer 702 may determine that received acoustic data has the context of being "recorded in a restaurant" with a high degree of confidence because acoustic data analyzer 702 is able to retrieve time and location data from the mobile device, locate and retrieve an email from an email application 320 confirming a dinner reservation at a restaurant at the retrieved time and location, as well as receiving voice data from the mobile device's speaker of the mobile device user checking in with the hostess of a restaurant. This various information can be used to indicate with a degree a certainty that the context associated with the received acoustic data is "recorded in a restaurant". In some embodiments, the confidence metric may be indicated as a numeric value between zero and one, inclusive, wherein a confidence metric of zero (e.g., there is no data to use to determine context) indicates that context could not be determined, and a confidence metric of one indicates that the assigned context is completely correct (e.g., high quality and quantity of corroborating data). For example, mobile device 620 may receive acoustic data in the form of a voice query from mobile device 620 user with background noise and use context-aware acoustic model 701 and acoustic data analyzer 702 to assign a context to the received acoustic data, model output manager 306 can generate a text-based message displayed to the user via the app UI 340 such as "Are you currently at a restaurant?" wherein the user may be able to confirm or indicate the correct context associated with the acoustic data. In such a scenario, if the user confirmed the context then that information could be used by acoustic data analyzer to assign a confidence metric value of one because the user provided corroborating data. In some embodiments, this type of user feedback may be used to train/update the local context-aware acoustic model 701. Acoustic data, its assigned context, and its associated confidence metric may be transmitted as context-aware acoustic data 710 to federated language model server 110 to be used as training data for central models stored and operating on the server 110.

Detailed Description of Exemplary Aspects

Figure 4:
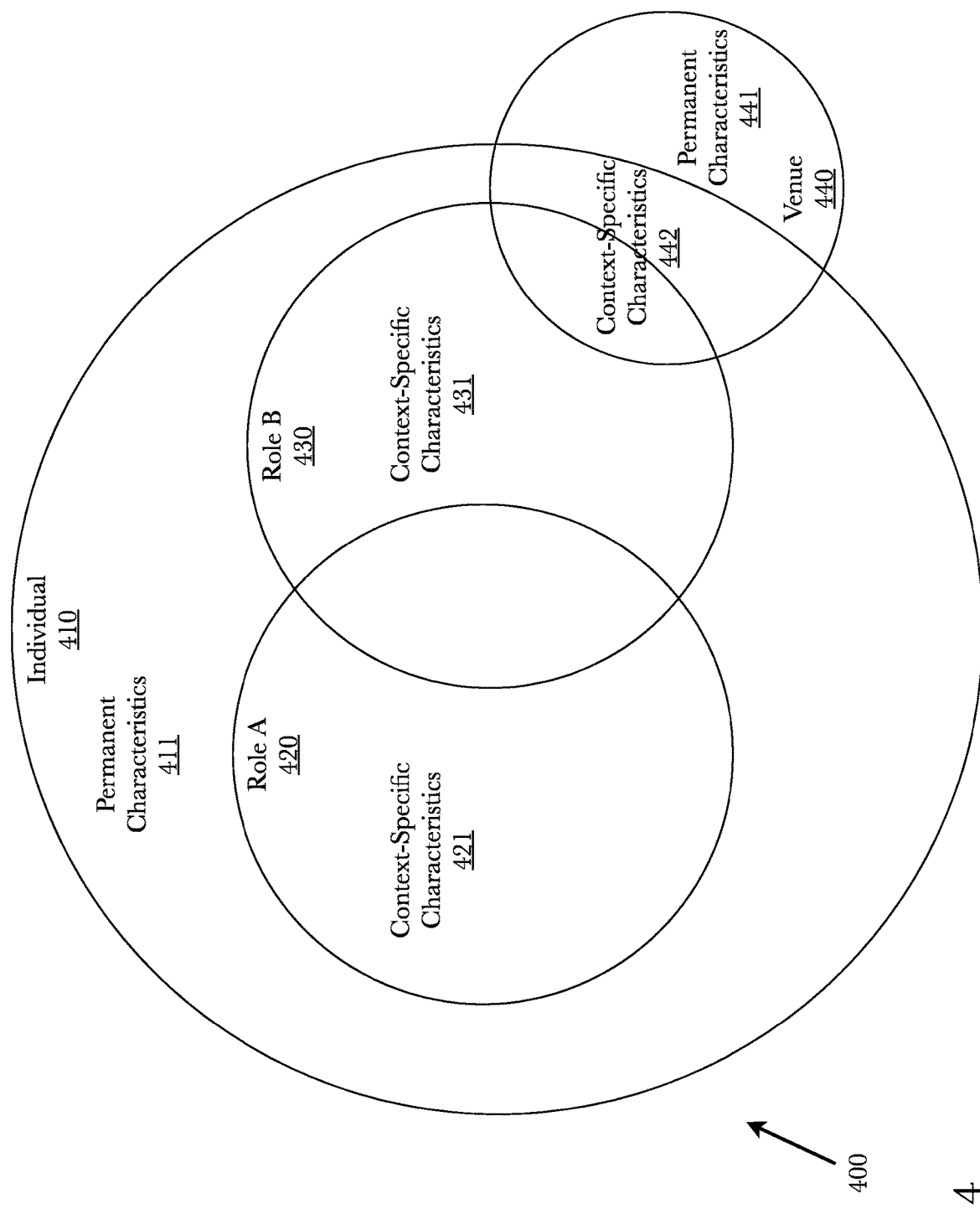
FIG. 4 is an exemplary diagram illustrating continuous nested learning about an individual, an individual's roles, and a venue.

FIG. 4 is an exemplary diagram illustrating continuous nested learning 400 about an individual, an individual's roles, and a venue. According to an embodiment, the system 100 may perform continuous learning about an individual, an individual in specific contexts, an individual's roles, and venues. In this diagram, the system 100 may first learn about an individual 410 using local language models operating on and context data gathered by the individual's mobile device. The local language models and context data may allow the system 100 to identify, determine, learn, or otherwise ascertain permanent characteristics 411 associated with the individual 410. Permanent characteristics of an individual may include attributes that determine an individual voice fingerprint (e.g., cadence, accent, timbre, pitch, etc.), common phrases, word patterns, and word choice. Once the system 100, via the local models on the mobile device, learn a strong set of permanent characteristics 411 that can be used to identify an individual and describe their spoken language habits and tendencies, it can quickly adapt the local language models to learn about any roles 420, 430 that may apply to the individual 410 based upon received and processed context data. Each role 420, 430 an individual may have may also have context-specific characteristics 421, 431 which may be unique to a given role and can be used to identify the current role of individual 410. Role B 430 may correspond to a waiter role for individual 410 and may be identifiable using the context-specific characteristics 431 and available context data. Individual 410 may be a waiter at a venue 440 and their role B 430 may share context-specific characteristics 442 associated with venue 440. These shared characteristics may be used to identify the role and venue where an individual may be located. In this way, as individual 410 is working as a waiter in venue 440 the system 100 can continuously learn and develop context-specific characteristics associated with role B 430 and venue 440 simultaneously using all available context data. Venue 440 may also have permanent characteristics 441 that can be used by the system 100 to identify a venue.

Over time, an individual's 410 permanent characteristics 411 may change, for example, the sound of a person's voice changes as they age. These changes may be applied to an individual's roles to account for the changes in permanent characteristics. In a similar fashion, context-specific characteristics 421, 431, 442, may be used by the system to adjust local language models operating on the individual's mobile device. In this way, the system 100 may continuously learn and adapt to varying roles, venues, actors, and context in a nested manner.

Figure 5:
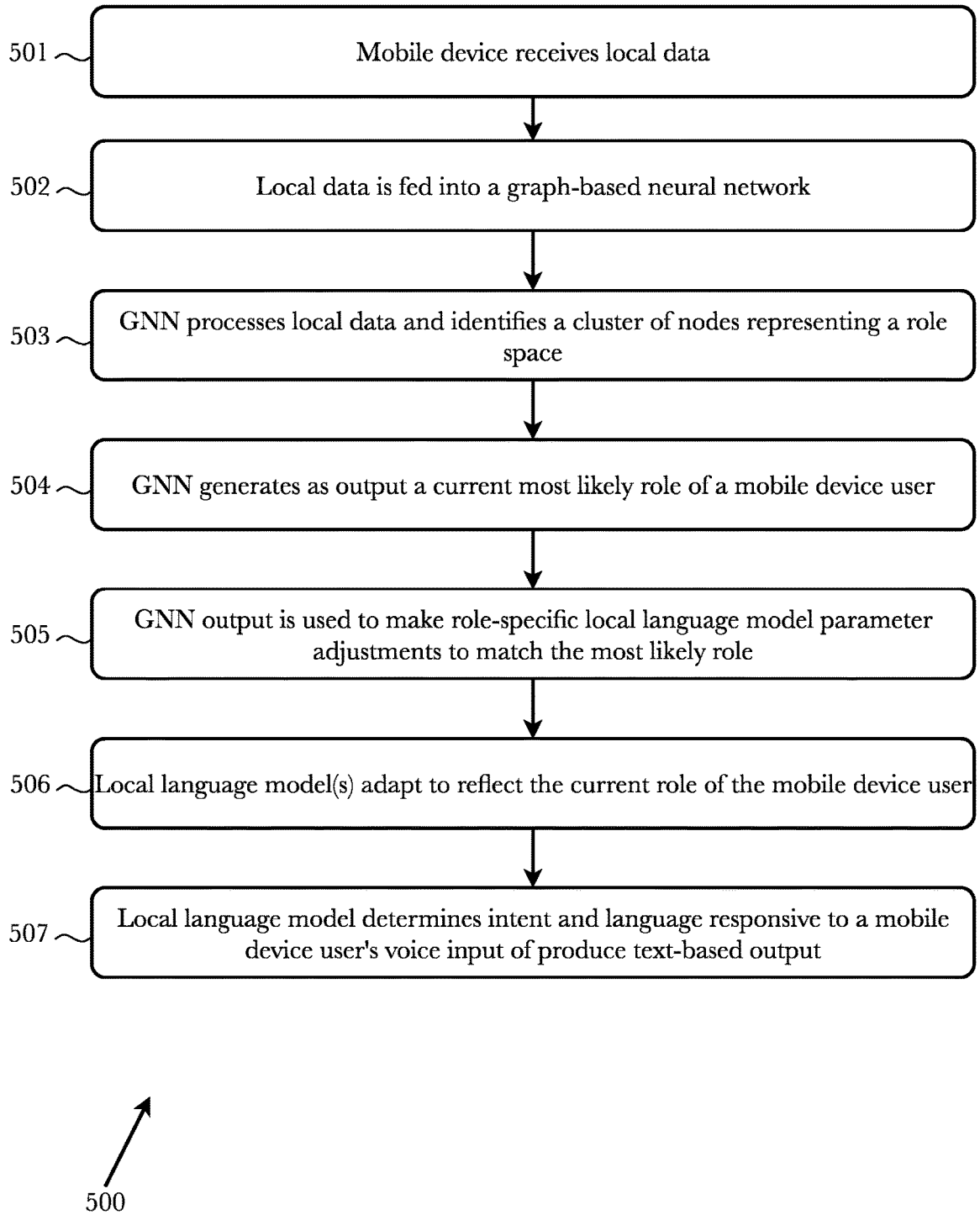
FIG. 5 is a flow diagram illustrating an exemplary method for federated, adaptive language modelling, according to one embodiment.

FIG. 5 is a flow diagram illustrating an exemplary method 500 for federated, adaptive language modelling, according to one embodiment. The process begins when a mobile device receives local data 501 from one or more mobile device sensors and other input mechanisms. Local data may comprise information related to actors, roles, venues, time, location, preferences, emails, text messages, phone calls, and may also include information gathered from external sources such as social media accounts, third-party databases, and websites. The received local data may then be used as input into a graph-based neural network (GNN) 502 which is constructed of nodes representing individuals, venues, actors, roles, and preferences, and edges which represent relationships and connections between nodes. The GNN may process local data and identify a cluster of nodes contained within the GNN which represents a logical role space 503. A role space cluster may be used to identify sections (clusters) of the graph that clearly indicate a specific type of role using the features of the nodes within the cluster, as well as the edge relationships that define the connections between the nodes. For example, the received local data may comprise information about an individual's location (e.g., currently located at a restaurant), information about an individual's work schedule, and time data which can be processed by the GNN to determine the individual's current role is as an employee. After the local data is processed, the GNN generates as output a current most likely role of the mobile device user 504. This output may be used by a speech recognition engine to make role-specific local language model parameter adjustments to match the current most likely device user role 505. For example, adjustments may be made to account for a change in dialect or vocabulary. Local language model(s) may then adapt to reflect the current role of the mobile device user 506 automatically and in real-time in response to the received local data. Last, the local language model determines intent and language responsive to a mobile device user's voice input to produce text-based output 507.

Figure 8:
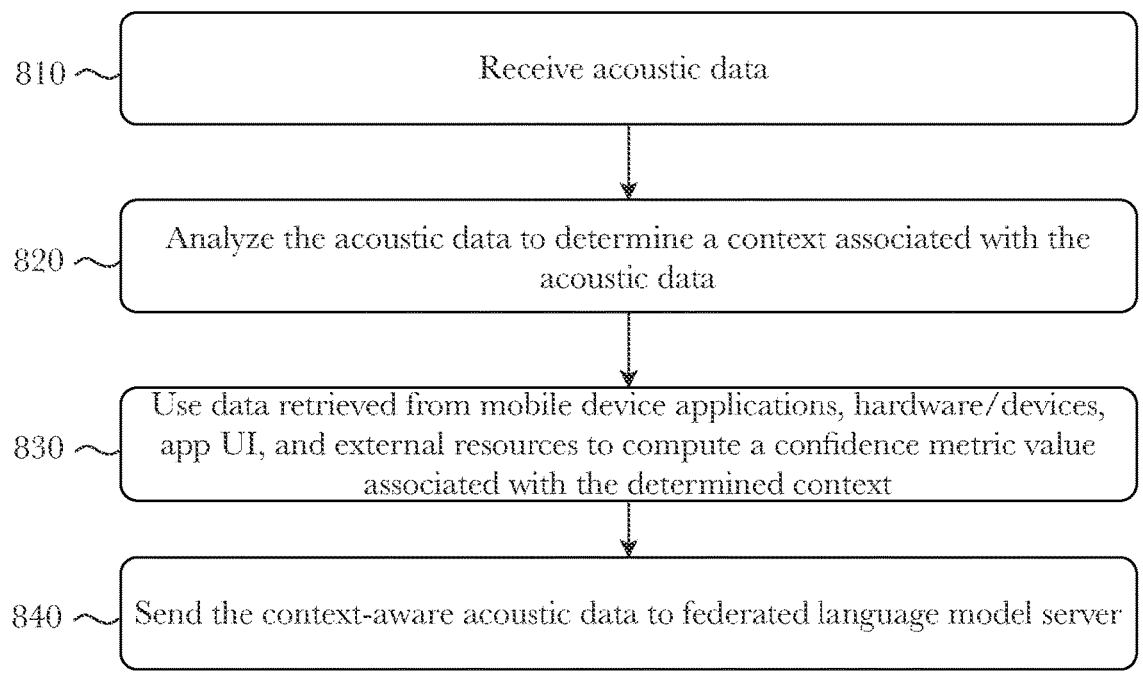
FIG. 8 is a flow diagram illustrating an exemplary method for determining context and a confidence metric value for a received acoustic data, according to some embodiments.

FIG. 8 is a flow diagram illustrating an exemplary method for determining context and a confidence metric value for a received acoustic data, according to some embodiments. At step 810 a mobile device may gather and/or receive acoustic data and send the acoustic data to an acoustic data analyzer 702 which can 820 analyze the acoustic data to determine a context associated with the acoustic data. Context may be determined by obtaining relevant data from mobile device applications 320, mobile device hardware/devices 330, app UI 340, and external resources 150. Also using this data, a confidence metric value may be computed (e.g., calculated, derived, inferred, etc.) to the determined context of the received acoustic data based on a plurality of data points that either indicate a high or low degree of certainty in the context determination 830. As a last step 840, mobile device may send the context-aware acoustic data, comprising acoustic data, its determined context, and a confidence metric value, to the federated language model server 110 where it may be used as a training data for one or more central models stored and operating on the server 110.

Figure 9:
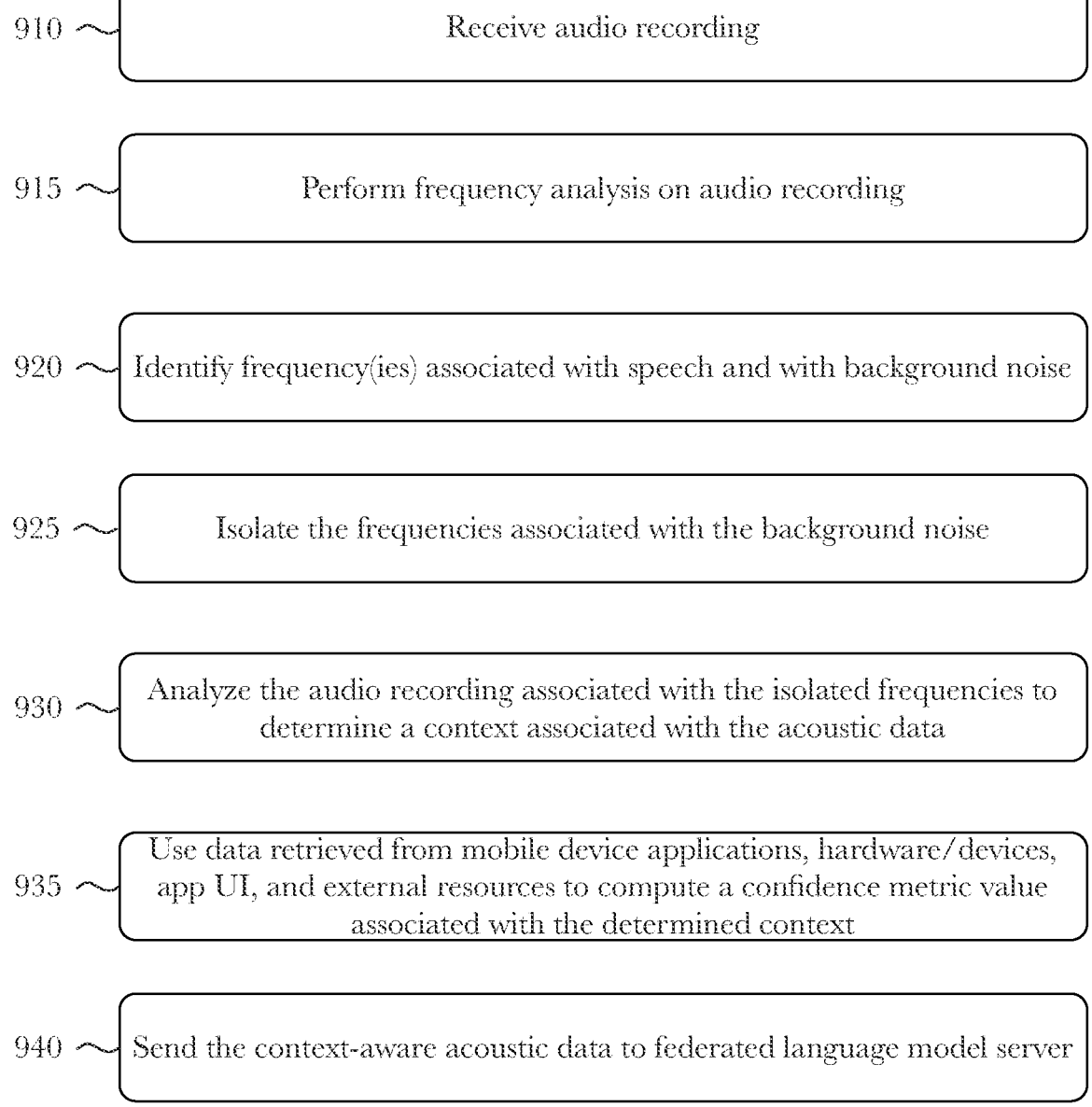
FIG. 9 is another flow diagram illustrating an exemplary method for determining context and confidence metric value for a received acoustic data, according to some embodiments.

FIG. 9 is another flow diagram illustrating an exemplary method for determining context and confidence metric value for a received acoustic data, according to some embodiments. At step 910 a mobile device may gather and/or receive an audio recording (i.e., acoustic data from a user submitted query) and send the audio recording to an acoustic data analyzer 702 which can be configured to perform frequency analysis on the audio recording at step 915. The frequency analysis can be used to identify within the audio recording frequencies associated with the user voice submitted query and the frequencies associated with the background noise of the audio recording 920. At step 925, the frequencies associated with the background noise may be isolated and then acoustic data analyzer 702 can 930 analyze the acoustic data to determine a context associated with the acoustic data. In some embodiments, an optional step of converting the isolated background noise to text may be performed by speech recognition engine 700. Context may be determined by obtaining relevant data from mobile device applications 320, mobile device hardware/devices 330, app UI 340, and external resources 150. Also using this data, a confidence metric value may be computed (e.g., calculated, derived, inferred, etc.) to the determined context of the received acoustic data based on a plurality of data points that either indicate a high or low degree of certainty in the context determination 935. As a last step 940, mobile device may send the context-aware acoustic data, comprising acoustic data, its determined context, and a confidence metric value, to the federated language model server 110 where it may be used as a training data for one or more central models stored and operating on the server 110.

Figure 10:
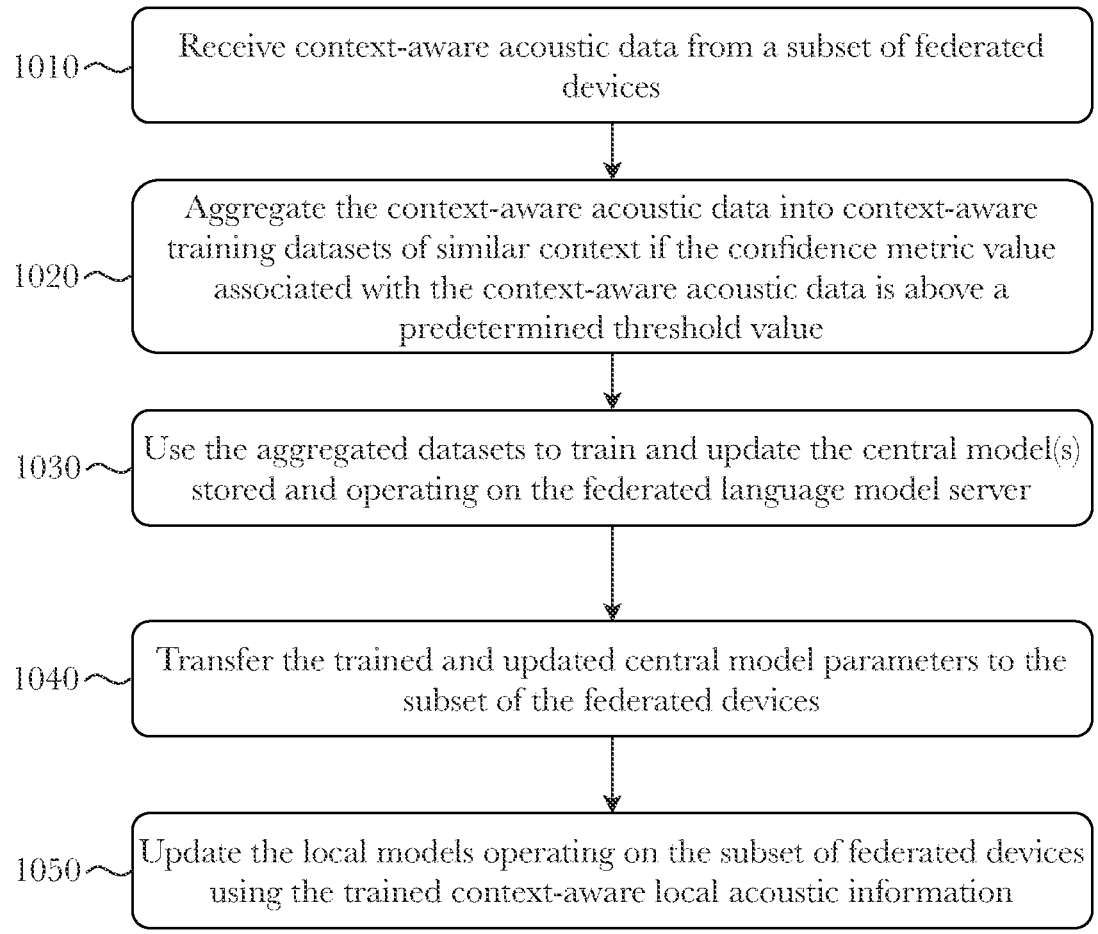
FIG. 10 is a flow diagram illustrating an exemplary method for updating central models using context-aware acoustic data, according to various embodiments.

FIG. 10 is a flow diagram illustrating an exemplary method for updating central models using context-aware acoustic data, according to various embodiments. At step 1010, federate language model server 110 may receive context-aware acoustic data from a subset of federated devices (i.e., mobile devices 620). As a next step 1020, server 110 may aggregate the context-aware acoustic data into datasets of similar context if the confidence metric value associated with the context-aware acoustic data is above a predetermined threshold value. As each acoustic data is received from one of the mobile devices belonging to the subset of federated devices, its associated confidence metric value may be compared against a threshold value, wherein acoustic data with confidence metric values above the threshold may be aggregated into one or more training datasets and wherein acoustic data with confidence metric values below the threshold value may be discarded. At step 1030, federate language model server 110 may use the aggregated datasets to train and update central models (e.g., language and context-aware acoustic models) stored and operating on the federated language model server 110. After the central models have been trained and updated with the aggregated datasets, the updated central model parameters may be transferred back to the subset of federated mobile devices 620 at step 1040. As a last step 1050, an update manager 311 operating on the mobile device 620 may update the local language and context-aware acoustic model(s) 701 with the received updated central model parameters and using the trained context-aware local acoustic information.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 11:
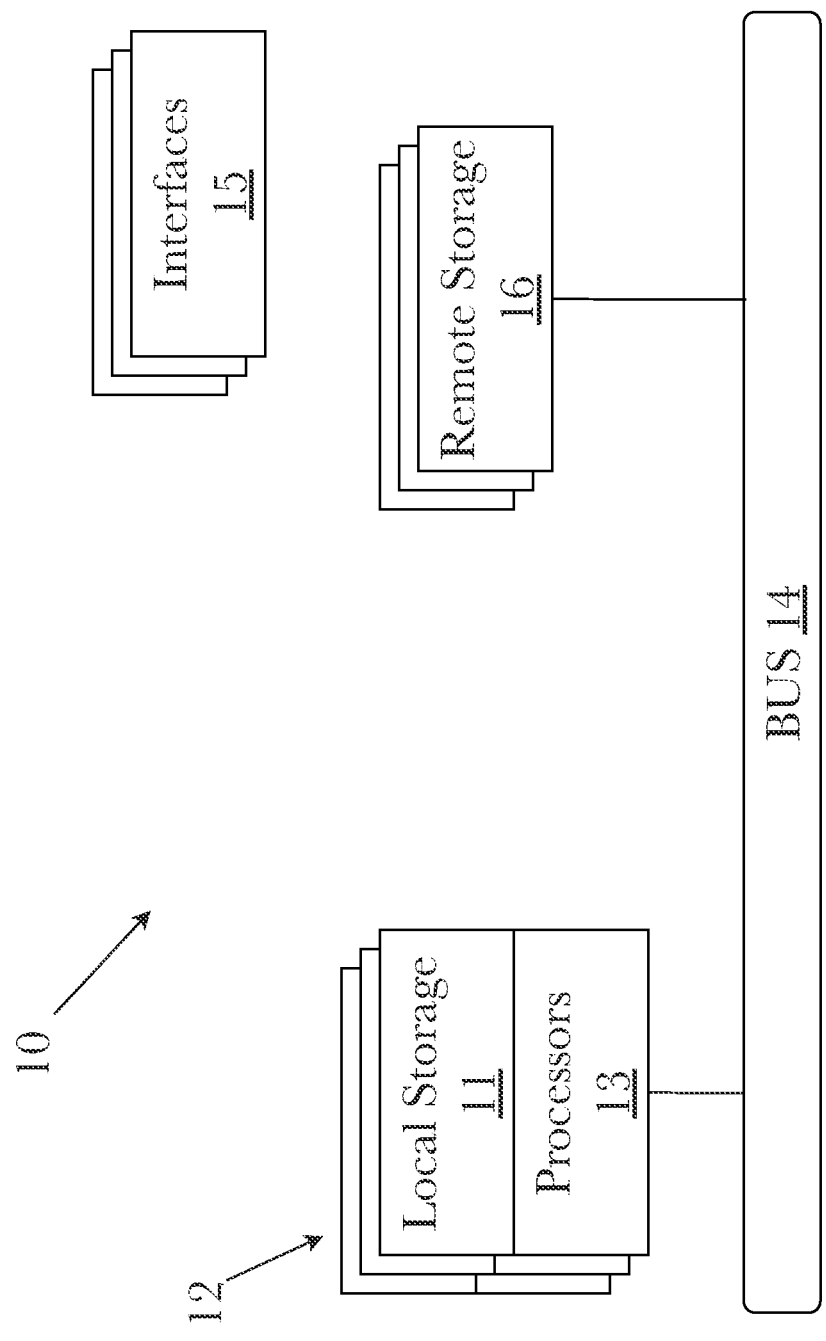
FIG. 11 is a block diagram illustrating an exemplary hardware architecture of a computing device.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 11 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
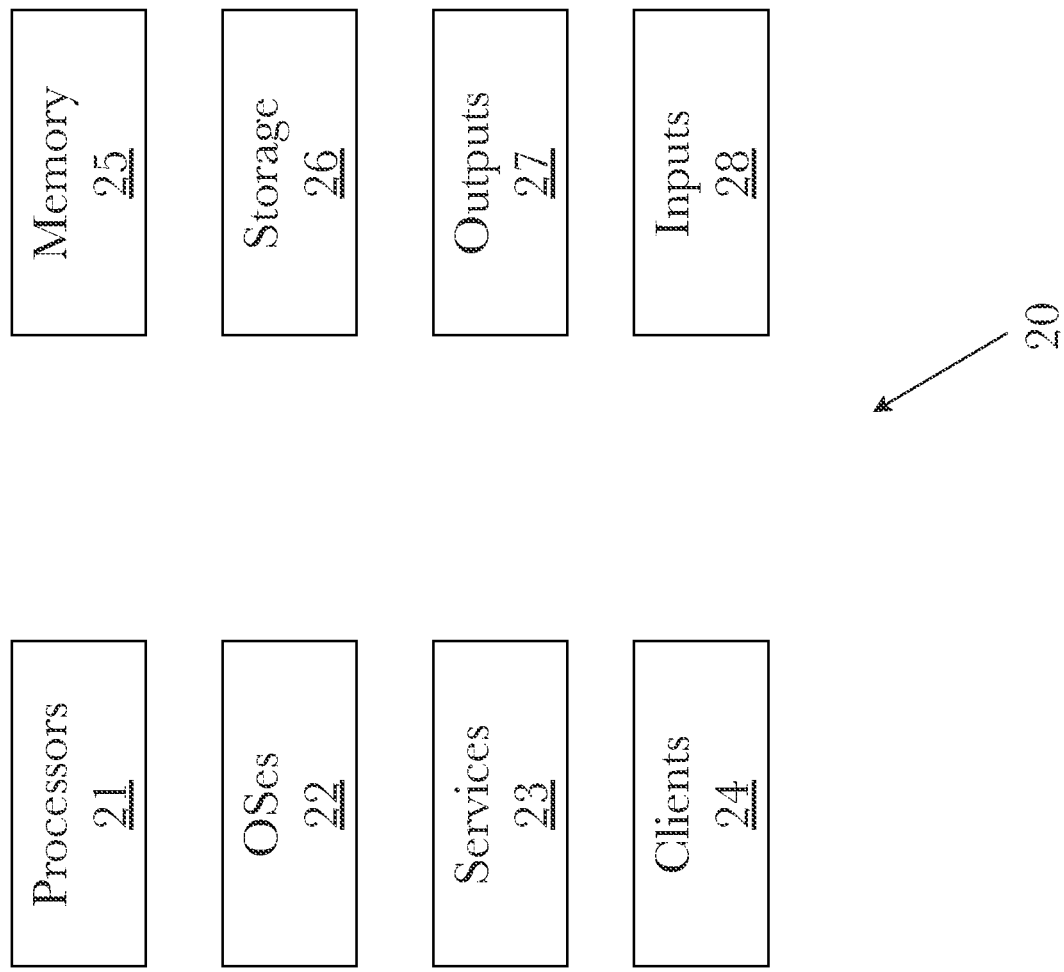
FIG. 12 is a block diagram illustrating an exemplary logical architecture for a client device.

In some aspects, systems may be implemented on a standalone computing system. Referring now to FIG. 12, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 11). Examples of storage devices 26 include flash memory, magnetic hard drive, CD-ROM, and/or the like.

Figure 13:
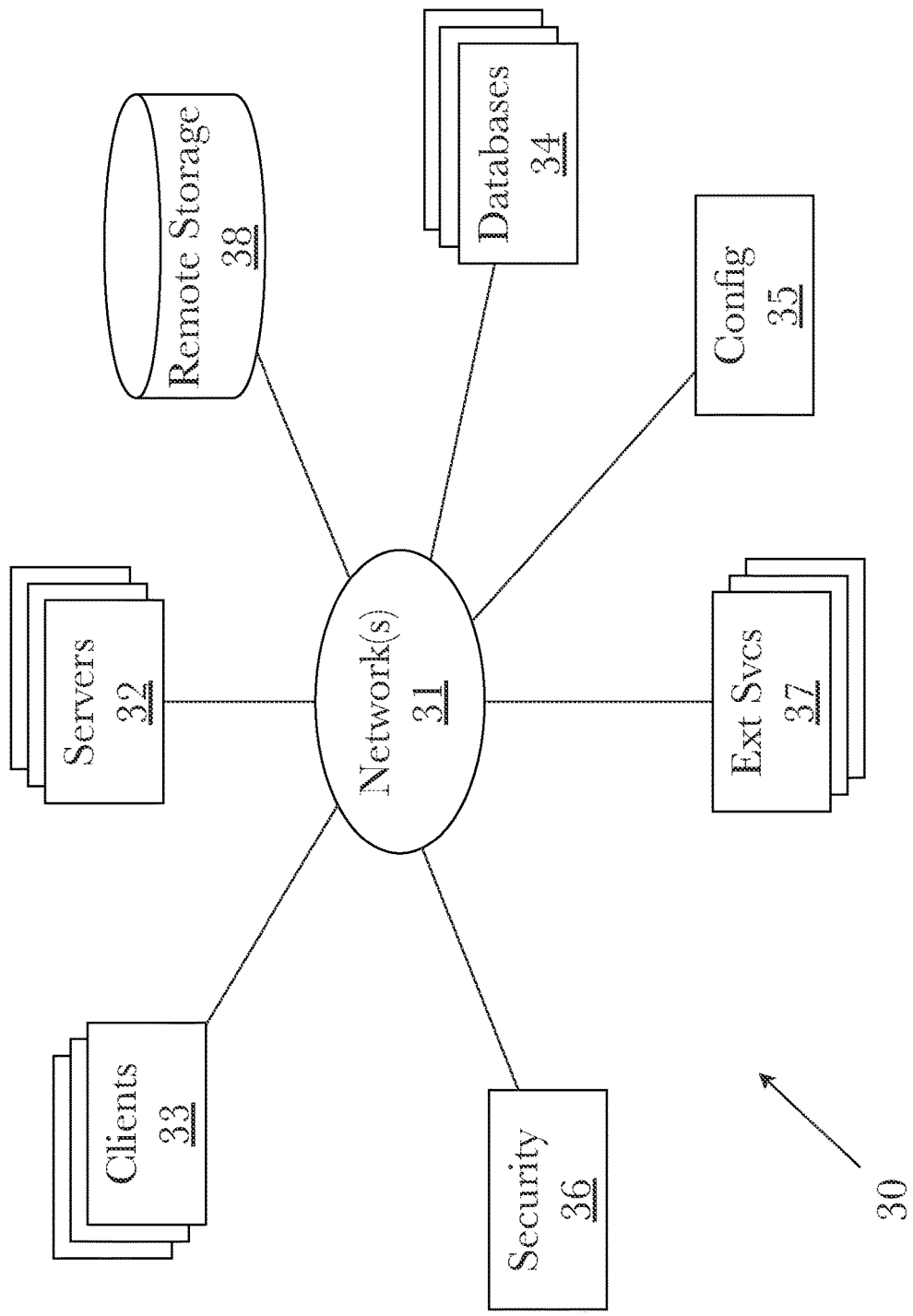
FIG. 13 is a block diagram showing an exemplary architectural arrangement of clients, servers, and external services.

In some aspects, systems may be implemented on a distributed computing network, such as one having any number of clients and/or servers. Referring now to FIG. 13, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 12. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth).

In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 14:
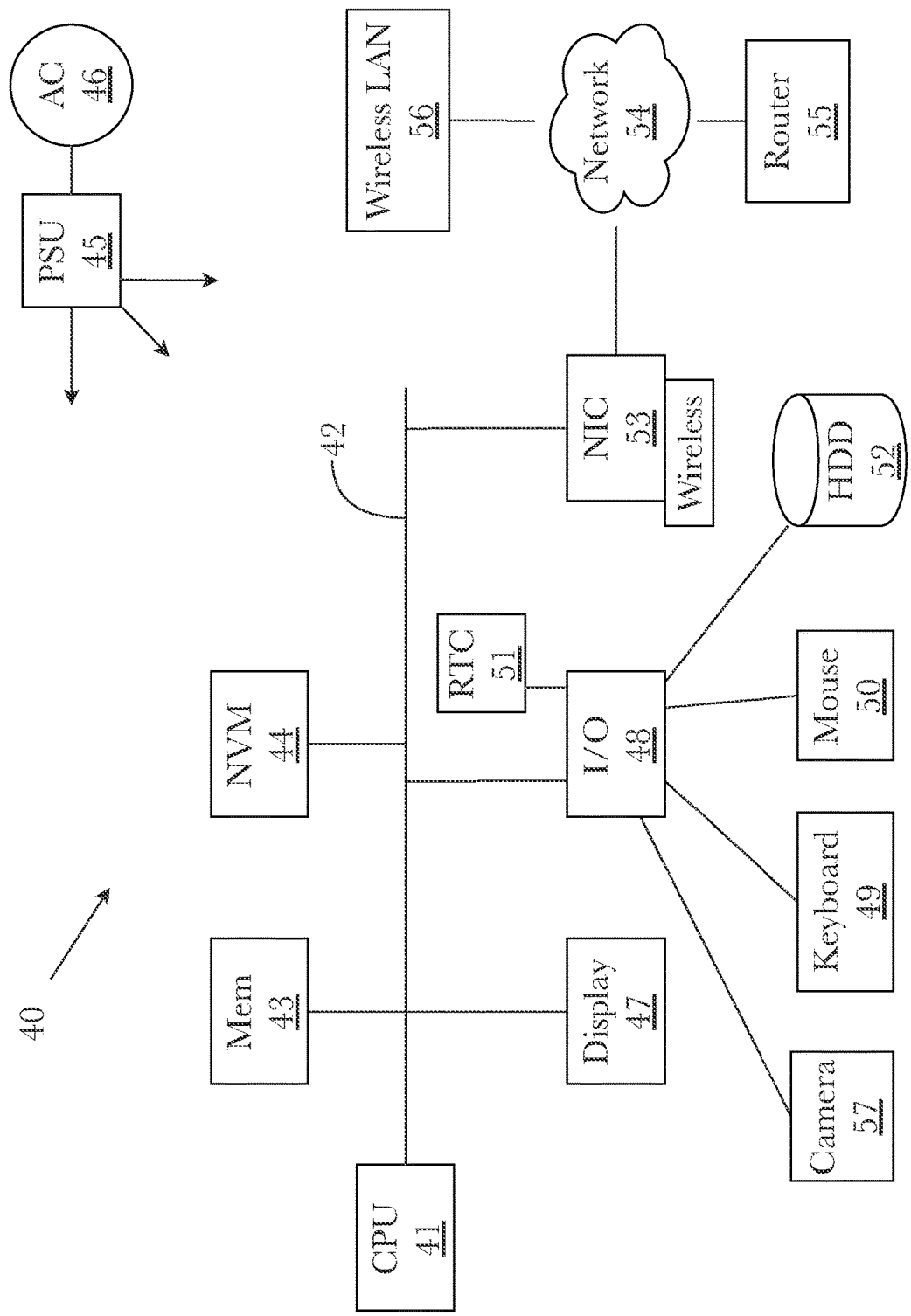
FIG. 14 is another block diagram illustrating an exemplary hardware architecture of a computing device.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to peripherals such as a keyboard 49, pointing device 50, hard disk 52, real-time clock 51, a camera 57, and other peripheral devices. NIC 53 connects to network 54, which may be the Internet or a local network, which local network may or may not have connections to the Internet. The system may be connected to other computing devices through the network via a router 55, wireless local area network 56, or any other network connection. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:
1. A system for federated, context-sensitive, acoustic model refinement, comprising:
one or more edge devices, comprising at least a plurality of programming instructions stored in the memory of, and operating on at least one processor of, a computing device, wherein the plurality of programming instructions, when operating on the at least one processor, cause the computing device to:
receive context-based model adjustments;
receive updated machine and deep learning central model parameters;
apply the context-based model adjustments to the local models stored in the edge device;
apply the updated machine and deep learning central model parameters to the local models stored in the edge device;
receive local acoustic data from edge device sensors and other input mechanisms;
receive local data from edge device applications, hardware, devices, and external resources;
determine a context associated with local acoustic data based on the received local data and compute a confidence metric value associated with the determined context;
feed the received local data and the determined context as input into one or more of the updated local machine and deep learning models to generate text-based output responsive to an edge device user query;
forward text-based output to an endpoint device and set up processes necessary for fulfillment of the edge device user query;
train and update local machine and deep learning models using the received local acoustic data; and
upload context-aware acoustic data comprising the local acoustic data, the determined context, and the confidence metric value, to a federated language model server; and
a federated language model server, comprising at least a plurality of programming instructions stored in the memory of, and operating on at least one processor of, a computing device, wherein the plurality of programming instructions, when operating on the processor, causes the computer system to:
select a subset of edge devices to upload context-aware acoustic data;
compare the confidence metric values with a predetermined threshold value, wherein acoustic data associated with confidence metric values greater than the predetermined threshold value may be aggregated into a context-aware training dataset;
update the machine and deep learning central models using the context-aware training dataset;
send the updated machine and deep learning central models to the one or more edge devices;
receive and store central data from the edge devices and external sources;

feed the central data into the machine and deep learning central models to generate as output context-based model adjustments for the local machine and deep learning models; and send the context-based adjustments to the one or more edge devices.

2. The system of claim 1 wherein the global machine and deep learning models comprise a graph-based neural network.

3. The system of claim 2 wherein the graph-based neural network identifies a cluster of nodes representing a role boundary, and generates as output a most likely role based upon the identified cluster of nodes.

4. The system of claim 3 wherein the edge device uses the outputted most likely role and makes parameter adjustments responsive to the outputted most likely role to one or more machine and deep learning models.

5. The system of claim 1 wherein the global machine and deep learning models comprise a recurrent neural network.

6. The system of claim 3 wherein the recurrent neural network comprises a long short-term memory neural network.

7. The system of claim 1 wherein the local data comprises information about actors, roles, venues, times, devices, and locations.

8. A method for federated, context-sensitive, acoustic model refinement, comprising the steps of:

receiving context-based model adjustments;

receiving updated machine and deep learning central model parameters;

applying the context-based model adjustments to the local models stored in the edge device;

applying the updated machine and deep learning central model parameters to the local models stored in the edge device;

receiving local acoustic data from edge device sensors and other input mechanisms;

receive local data from edge device applications, hardware, devices, and external resources;

determining a context associated with local acoustic data based on the received local data and computing a confidence metric value associated with the determined context;

feeding the received local data and the determined context as input into one or more of the updated local machine and deep learning models to generate text-based output responsive to an edge device user query;

forwarding text-based output to an endpoint device and set up processes necessary for fulfillment of the edge device user query;

training and update local machine and deep learning models using the received local acoustic data;

uploading context-aware acoustic data comprising the local acoustic data, the determined context, and the confidence metric value, to a federated language model server;

selecting a subset of edge devices to upload context-aware acoustic data;

comparing the confidence metric values with a predetermined threshold value, wherein acoustic data associated with confidence metric values greater than the predetermined threshold value may be aggregated into a context-aware training dataset;

updating the machine and deep learning central models the machine and deep learning central models using the context-aware training dataset;

sending the updated machine and deep learning central models to the one or more edge devices;

receiving and store central data from the edge devices and external sources;

feeding the central data into the machine and deep learning central models to generate as output context-based model adjustments for the local machine and deep learning models; and sending the context-based adjustments to the one or more edge devices.

9. The method of claim 8 wherein the global machine and deep learning models comprise a graph-based neural network.

10. The method of claim 9 wherein the graph-based neural network identifies a cluster of nodes representing a role boundary, and generates as output a most likely role based upon the identified cluster of nodes.

11. The method of claim 10 wherein the edge device uses the outputted most likely role and makes parameter adjustments responsive to the outputted most likely role to one or more machine and deep learning models.

12. The method of claim 8 wherein the global machine and deep learning models comprise a recurrent neural network.

13. The method of claim 12 wherein the recurrent neural network comprises a long short-term memory neural network.

14. The method of claim 8 wherein the local data comprises information about actors, roles, venues, times, devices, and locations.

* * * * *